(12) United States Patent
Elmestrand et al.

(10) Patent No.: US 12,337,272 B2
(45) Date of Patent: Jun. 24, 2025

(54) FINE FILTER PART KIT FOR A DUST EXTRACTOR AND A METHOD FOR REMOVING A FINE FILTER PART

(71) Applicant: HUSQVARNA AB, Huskvarna (SE)

(72) Inventors: Karl Elmestrand, Sävedalen (SE); Elon Wennberg, Hisings Backa (SE); Axel Sjöberg, Västra Frölunda (SE); Jonas Eriksson, Knivsta (SE)

(73) Assignee: HUSQVARNA AB, Huskvarna (SE)

( * ) Notice: Subject to any disclaimer, the term of this patent is extended or adjusted under 35 U.S.C. 154(b) by 402 days.

(21) Appl. No.: 17/926,659

(22) PCT Filed: Jun. 4, 2021

(86) PCT No.: PCT/SE2021/050537
§ 371 (c)(1),
(2) Date: Nov. 21, 2022

(87) PCT Pub. No.: WO2021/251876
PCT Pub. Date: Dec. 16, 2021

(65) Prior Publication Data
US 2023/0233979 A1    Jul. 27, 2023

(30) Foreign Application Priority Data

Jun. 11, 2020 (SE) .................................... 2050697-8
Jul. 9, 2020 (SE) .................................... 2050865-1
(Continued)

(51) Int. Cl.
*B01D 46/88* (2022.01)
*A47L 9/12* (2006.01)
(Continued)

(52) U.S. Cl.
CPC .............. *B01D 46/88* (2022.01); *A47L 9/127* (2013.01); *B01D 46/0004* (2013.01);
(Continued)

(58) Field of Classification Search
CPC ................ B01D 46/88; B01D 46/2411; B01D 46/2414; B01D 46/0005; B01D 46/0004;
(Continued)

(56) References Cited

U.S. PATENT DOCUMENTS 3,320,727 A    5/1967  Farley et al.
5,660,063 A    8/1997  Lee et al.
(Continued)

FOREIGN PATENT DOCUMENTS

CN    101176631 A    5/2008
CN    106377205 A    2/2017
(Continued)

OTHER PUBLICATIONS

International Search Report and Written Opinion for International Application No. PCT/SE2021/050537 mailed Oct. 13, 2021.
(Continued)

*Primary Examiner* — Robert Clemente
(74) *Attorney, Agent, or Firm* — Burr & Forman LLP

(57) ABSTRACT

The present disclosure relates to fine filter part kit (63), comprising a replacement fine filter part (15) that is adapted to be mounted to a fine filter section (12) for a dust extractor (1). The fine filter part kit (63) further comprises a filter lid (16) that is adapted to be mounted to a corresponding used fine filter part (15) to be replaced, already mounted to the fine filter section (12), and thereby seal an opening (28) of a particle containing space inside the used fine filter part (15) before removing the used fine filter part (15). In this way, release of particles contained in the particle containing space
(Continued)

into the ambient air is prevented and a secure disposal of the used fine filter part (15) is enabled.

20 Claims, 18 Drawing Sheets

(30) Foreign Application Priority Data

| Aug. 26, 2020 | (SE) | ................................. | 2050985-7 |
| Aug. 26, 2020 | (SE) | ................................. | 2050986-5 |
| Aug. 26, 2020 | (SE) | ................................. | 2050987-3 |

(51) Int. Cl.
*A47L 9/16* (2006.01)
*B01D 46/00* (2022.01)
*B01D 46/24* (2006.01)
*B01D 46/42* (2006.01)
*B01D 50/20* (2022.01)
*F16J 15/3284* (2016.01)

(52) U.S. Cl.
CPC ...... *B01D 46/0005* (2013.01); *B01D 46/2411* (2013.01); *B01D 46/4227* (2013.01); *F16J 15/3284* (2013.01); *A47L 9/16* (2013.01); *B01D 50/20* (2022.01); *B01D 2265/022* (2013.01); *B01D 2265/029* (2013.01); *B01D 2271/022* (2013.01); *B01D 2271/027* (2013.01); *B01D 2279/55* (2013.01)

(58) Field of Classification Search
CPC .......... B01D 46/4227; B01D 2271/022; B01D 2271/027; B01D 2265/022; B01D 2265/027; B01D 2265/029; B01D 2279/55; A47L 9/127; A47L 9/16; A47L 9/1666

See application file for complete search history.

(56) References Cited

U.S. PATENT DOCUMENTS

| 6,524,411 | B2 | 2/2003 | Pulek et al. |
| 6,627,078 | B1 | 9/2003 | Wagner et al. |
| 7,166,141 | B2 | 1/2007 | MacLeod et al. |
| 8,167,966 | B2 | 5/2012 | Amirkhanian et al. |
| 8,206,482 | B2 | 6/2012 | Williams et al. |
| 10,071,178 | B2 | 9/2018 | Dudley, Jr. |
| 10,149,586 | B2 | 12/2018 | Liu |
| 10,239,010 | B2 | 3/2019 | Sang et al. |
| 2003/0131441 | A1* | 7/2003 | Murphy ..................... A47L 5/32 15/352 |
| 2004/0083694 | A1 | 5/2004 | Choi |
| 2005/0198767 | A1* | 9/2005 | Kang ...................... A47L 9/127 15/353 |
| 2006/0101610 | A1 | 5/2006 | Oh et al. |
| 2008/0172992 | A1 | 7/2008 | Conrad |
| 2023/0031982 | A1* | 2/2023 | Mössinger ............ B01D 46/88 |
| 2023/0200605 | A1* | 6/2023 | Elmestrand ............... A47L 9/16 15/300.1 |
| 2023/0210330 | A1* | 7/2023 | Elmstrand ............ B01D 45/12 55/324 |

FOREIGN PATENT DOCUMENTS

| CN | 106510549 A | 3/2017 |
| CN | 108606721 A | 10/2018 |
| DE | 7214945 U | 12/1981 |
| DE | 3405719 A1 | 8/1985 |
| DE | 19642641 A1 | 5/1997 |
| EP | 139639 A1 | 5/1985 |
| EP | 213930 A2 | 3/1987 |
| EP | 956892 A1 | 11/1999 |
| EP | 860191 B1 | 5/2000 |
| EP | 2201993 A1 | 6/2010 |
| JP | 54022957 A | 2/1979 |
| JP | 2015121347 A | 7/2015 |
| WO | 2018044312 A1 | 3/2018 |
| WO | 2018067988 A1 | 4/2018 |
| WO | 2018188597 A1 | 10/2018 |

OTHER PUBLICATIONS

Office Action and Search Report for SE Patent Application No. 2050985-7 mailed May 14, 2021.
Office Action and Search Report for SE Patent Application No. 2050986-5 mailed May 14, 2021.
Office Action and Search Report for SE Patent Application No. 2050987-3 mailed May 14, 2021.
HEPA Lids overview, 4 pages.

* cited by examiner

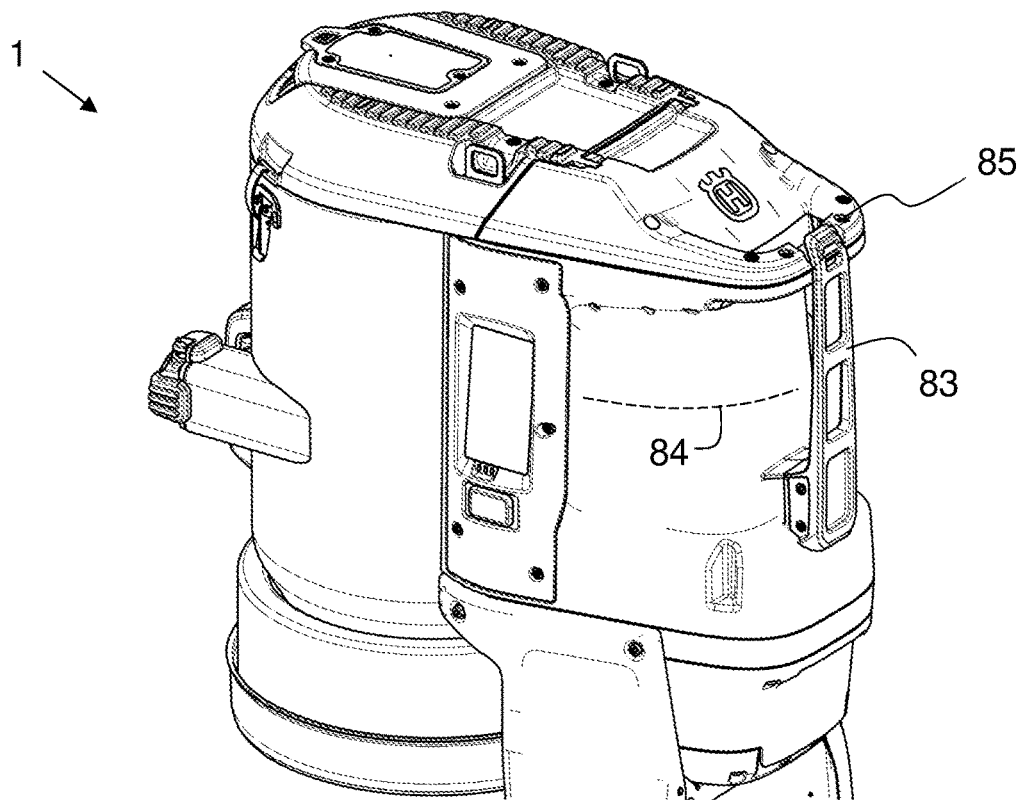
FIG. 22
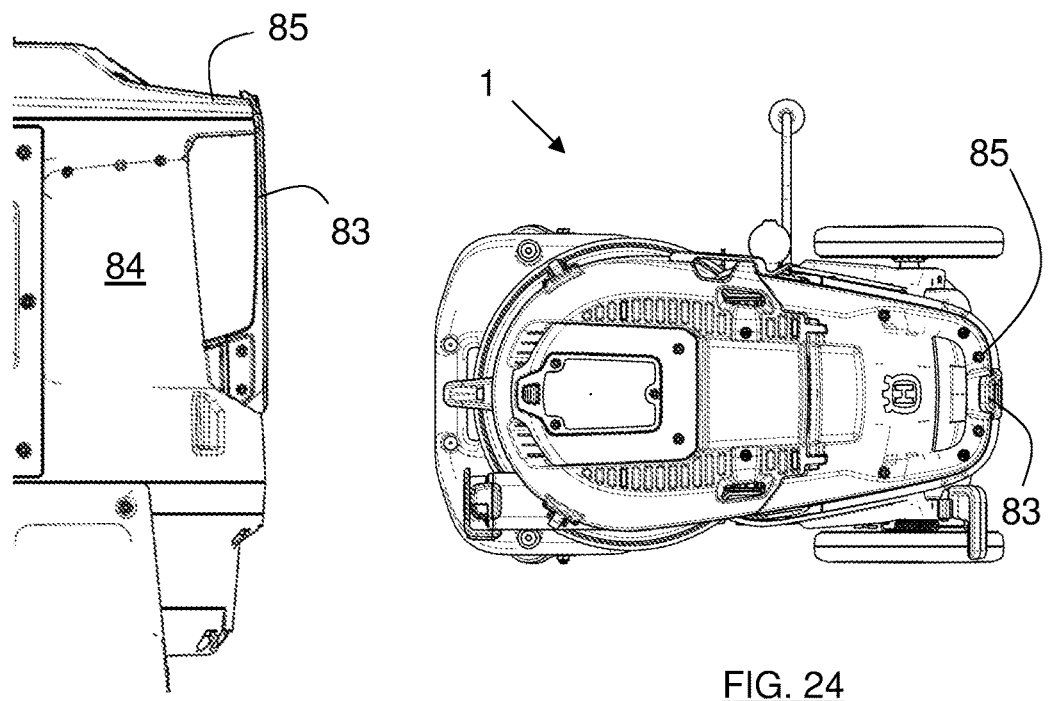
FIG. 23
FIG. 24

FINE FILTER PART KIT FOR A DUST EXTRACTOR AND A METHOD FOR REMOVING A FINE FILTER PART

TECHNICAL FIELD

The present disclosure relates to a dust extractor arrangement with a dust cyclone container, where a fine filter part is adapted to be mounted downstream a coarse filter part.

BACKGROUND

In workplaces where chips or dust are prone to occur, there is usually a dust extractor used for collecting chips and dust that otherwise would be flying in the air, thus maintaining the quality of the air and cleaning the environment. In this way, the safety of the workplace is ensured, while facilitating the follow-up cleaning.

A conventional dust extractor includes a main body, such as a dust cyclone container, a dust collection container, a coarse filter and a filter cylinder with a fine filter, for example a High-Efficiency Particulate Air (HEPA) filter, which is capable of filtering dust of PM2.5. A fine filter such as a HEPA filter is often referred to as an essential filter in the technical field of industrial grade dust extractors. An exhaust motor is used to suck an airflow with dust into the main body, where relatively heavy dust falls into the dust collection container due to gravity. Relatively light dust is sucked towards the coarse filter which prevents some dust to continue. The dust that continues is sucked through the coarse filter and is guided towards the fine filter in the filter cylinder via a hose that connects the coarse filter and the fine filter. After the fine filter, the air is sucked towards the exhaust motor and blown back into the ambient air.

When the fine filter is about to be replaced, an operator opens a lid that covers the filter cylinder, unscrews or loosens the filter cylinder, lifts it up and places it in a waste bag. During this process, very small particles that have been retained with the fine filter may come loose and get into the ambient air. Since these particles can be harmful to health, this is undesired. There is thus a desire to provide a dust extractor that is adapted for a more secure dust handling, in particular when replacing the fine filter that may contain hazardous particles.

It is furthermore desired to provide a dust extractor that is compact and easily moved along at a work site.

SUMMARY

The object of the present disclosure is to provide a dust extractor that is compact, versatile, easily moved along at a work site, easily transportable between work sites, and enables a secure dust handling, minimizing hazardous dust that is released in surrounding air, in particular when replacing a fine filter.

This object is achieved by means of a fine filter part kit, comprising a replacement fine filter part that is adapted to be mounted to a fine filter section for a dust extractor. The fine filter part kit further comprises a filter lid that is adapted to be mounted to a corresponding used fine filter part to be replaced, already mounted to the fine filter section, and thereby seal an opening of a particle containing space inside the used fine filter part before removing the used fine filter part.

In this way, release of particles contained in the particle containing space into the ambient air is prevented and a secure disposal of the used fine filter part is enabled.

According to some aspects, the filter lid comprises a handle such that a user is enabled to lift and handle the fine filter part by means of the handle when the filter lid is mounted to the fine filter part.

In this way, the fine filter part is easily handled during replacement.

According to some aspects, the filter lid comprises lid thread means, and the fine filter part comprises filter closing thread means that are adapted to engage the lid thread means when the filter lid is mounted to the fine filter part.

In this way, the filter lid can be securely attached to the fine filter part.

According to some aspects, the fine filter part further comprises filter mounting engagement means that is adapted for sealingly mounting the fine filter part to an operational filtering position in the fine filter section.

According to some aspects, the fine filter part comprises a filter rim surrounding an opening of a particle containing space inside the fine filter part. The filter mounting engagement means comprises a circumferentially running seal facing radially outwards from a center axis of the fine filter part. The seal in turn comprises an axial seal part and a radial seal part, where the seal parts are separated along a line parallel to the center axis of the fine filter part such that the axial seal part is closest to the opening.

This means that the fine filter part can be easily and securely mounted to the fine filter section. Also, the combination of the axial seal part with the radial seal part provides friction to resist turning of the fine filter part when received in the fine filter part section. This friction simplifies, e.g., closing and opening the fine filter by the threaded fine filter lids disclosed herein.

According to some aspects, the seal comprises an intermediate seal part that is arranged between the axial seal part and the radial seal part, where the seal parts are coherently arranged.

In this way, a versatile and secure seal is provided.

According to some aspects, the axial seal part and the radial seal part protrude beyond the intermediate seal part in a direction perpendicular to the center axis.

According to some aspects, the seal has an annular shape and is made in an elastic polymeric material, preferably rubber.

In this way, a versatile and secure seal is provided.

According to some aspects, the axial seal part protrudes beyond the radial seal part in a direction perpendicular to the center axis.

According to some aspects, fine filter part further comprises filter mounting thread means that are adapted to engage corresponding filter section thread means in the fine filter section when the fine filter part is mounted to the fine filter section.

According to some aspects, the filter mounting thread means are outer thread means and the filter section thread means are inner thread means.

According to some aspects, the filter closing thread means are inner thread means, and the lid thread means are outer thread means.

According to some aspects, the filter closing thread means and the filter mounting thread means are adapted to be tightened in mutually opposite directions.

This means that the rotation used for closing the fine filter part by mounting the filter lid to the fine filter part also releases the fine filter part from the fine filter section.

According to some aspects, the filter mounting thread means, and the filter section thread means form a bayonet arrangement where bayonet pins engage bayonet thread slots, the filter mounting thread means comprising bayonet pins and the filter section thread means comprising bayonet thread slots.

This enables a quick and reliable mounting of the fine filter part from the fine filter section and following release of the fine filter part from the fine filter section.

According to some aspects, there are at least three circumferentially and symmetrically positioned radially protruding bayonet pins, and preferably four circumferentially and symmetrically positioned radially protruding bayonet pins.

The present disclosure also relates to a fine filter part, a fine filter part and a fine filter section and methods that are associated with above advantages.

BRIEF DESCRIPTION OF THE DRAWINGS

The present disclosure will now be described more in detail with reference to the appended drawings, where:

FIGS. 22-24 show a dust extractor with a top lid handle and a holding strap.

DETAILED DESCRIPTION

Figure 1:
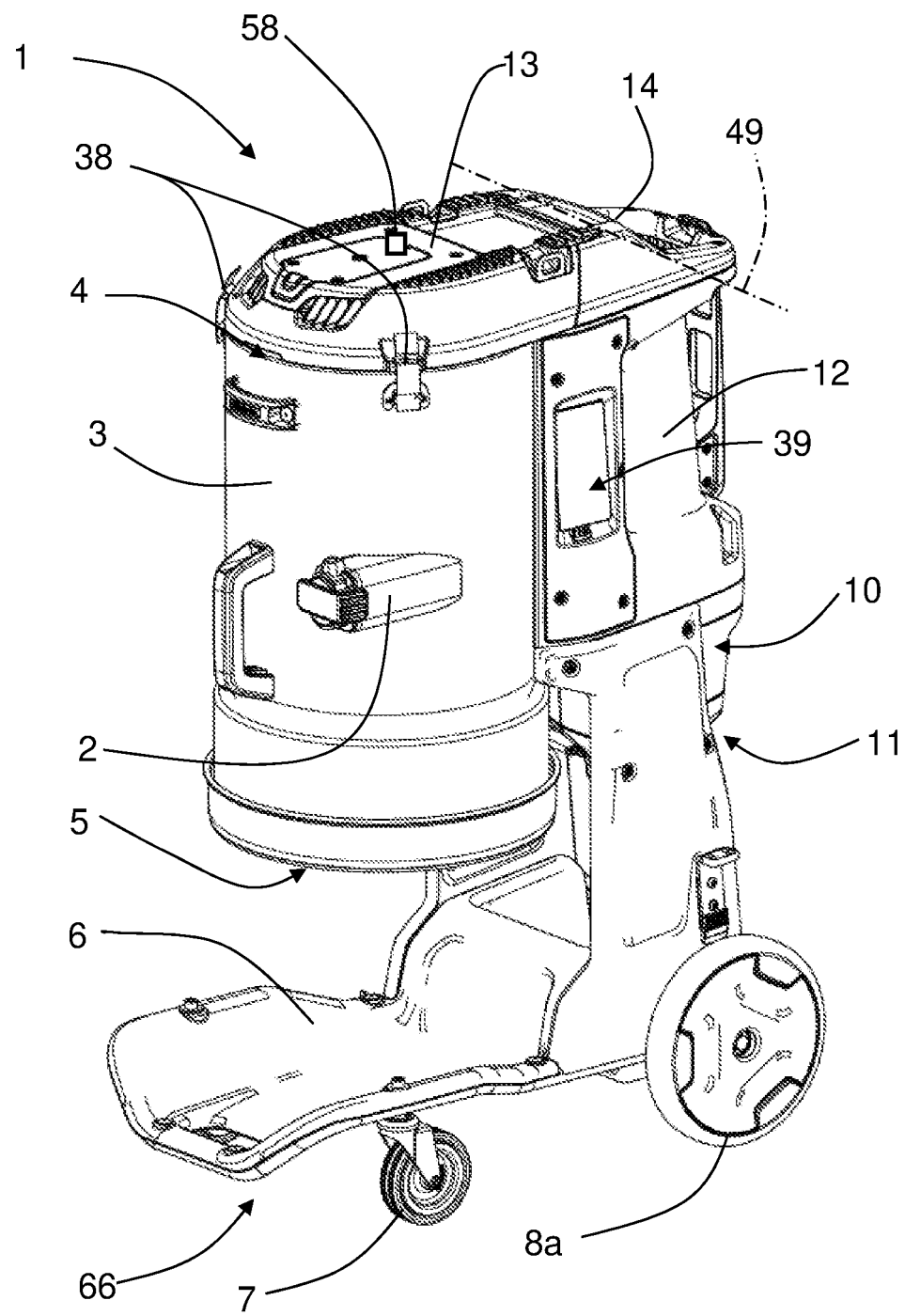
FIG. 1 shows a perspective front view of a dust extractor with mounted and closed lid parts.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 2:
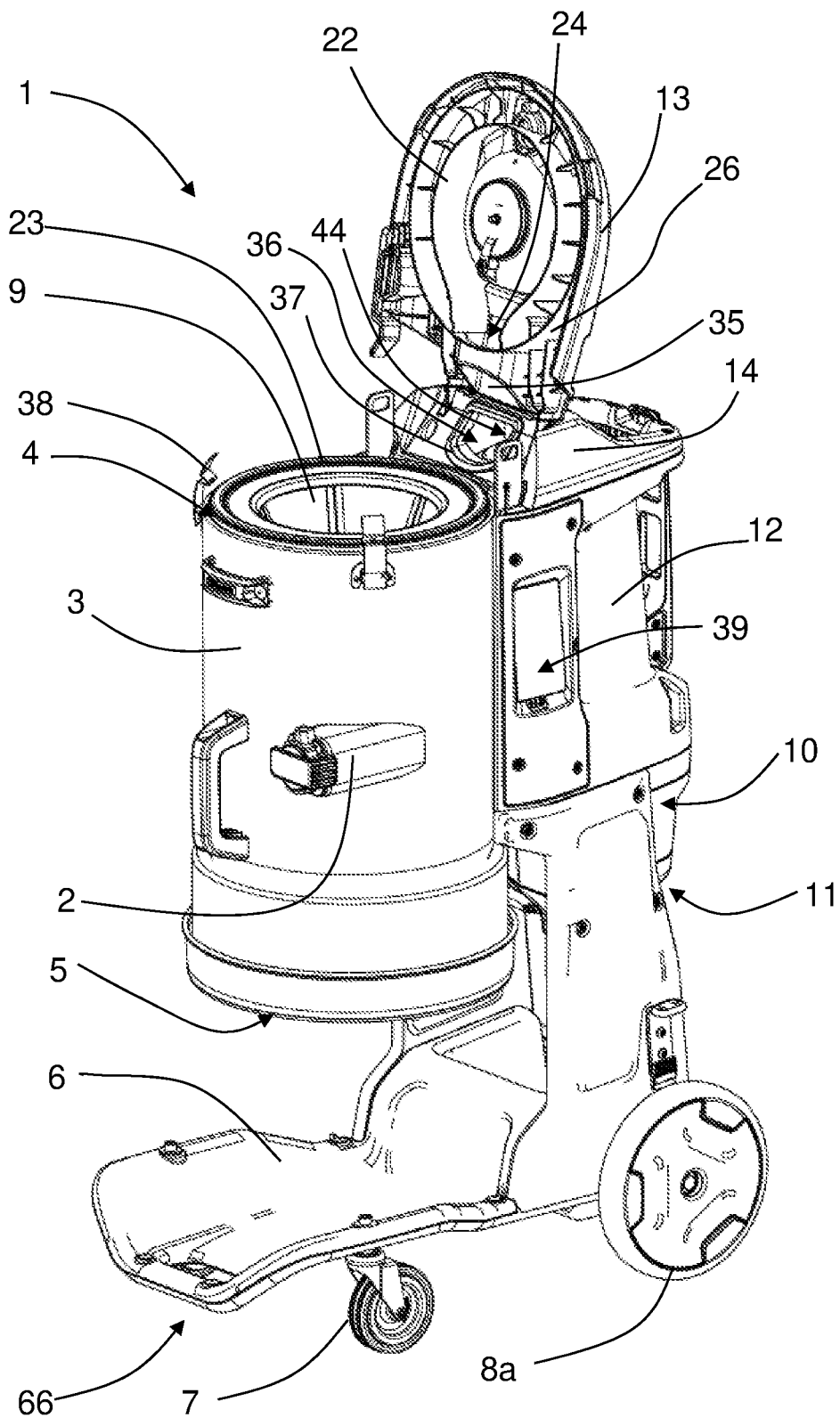
FIG. 2 shows the view of FIG. 1 where a first lid part is opened.
Figure 3:
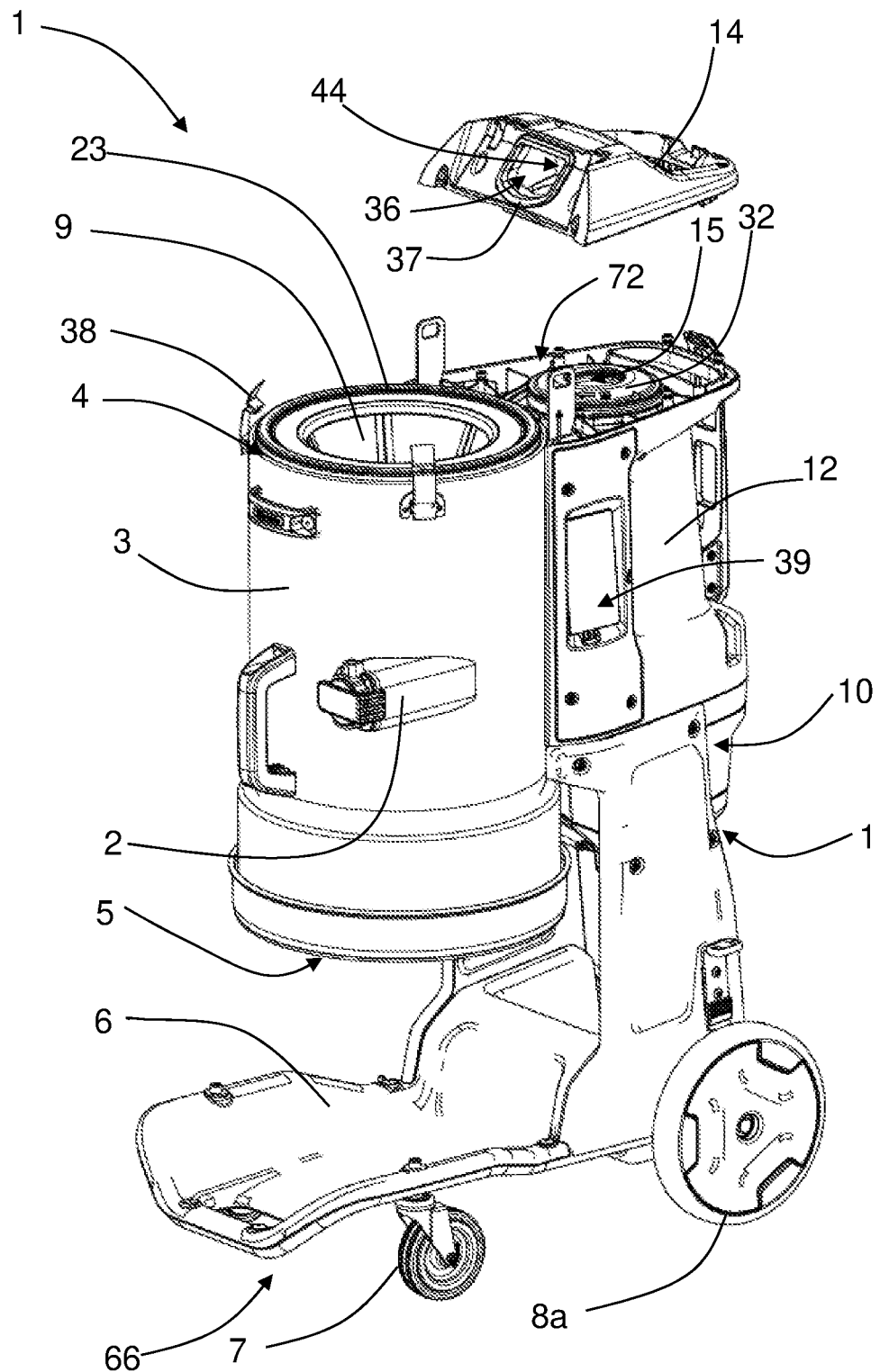
FIG. 3 shows the view of FIG. 1 without the first lid part and with a second lid part removed.
Figure 4:
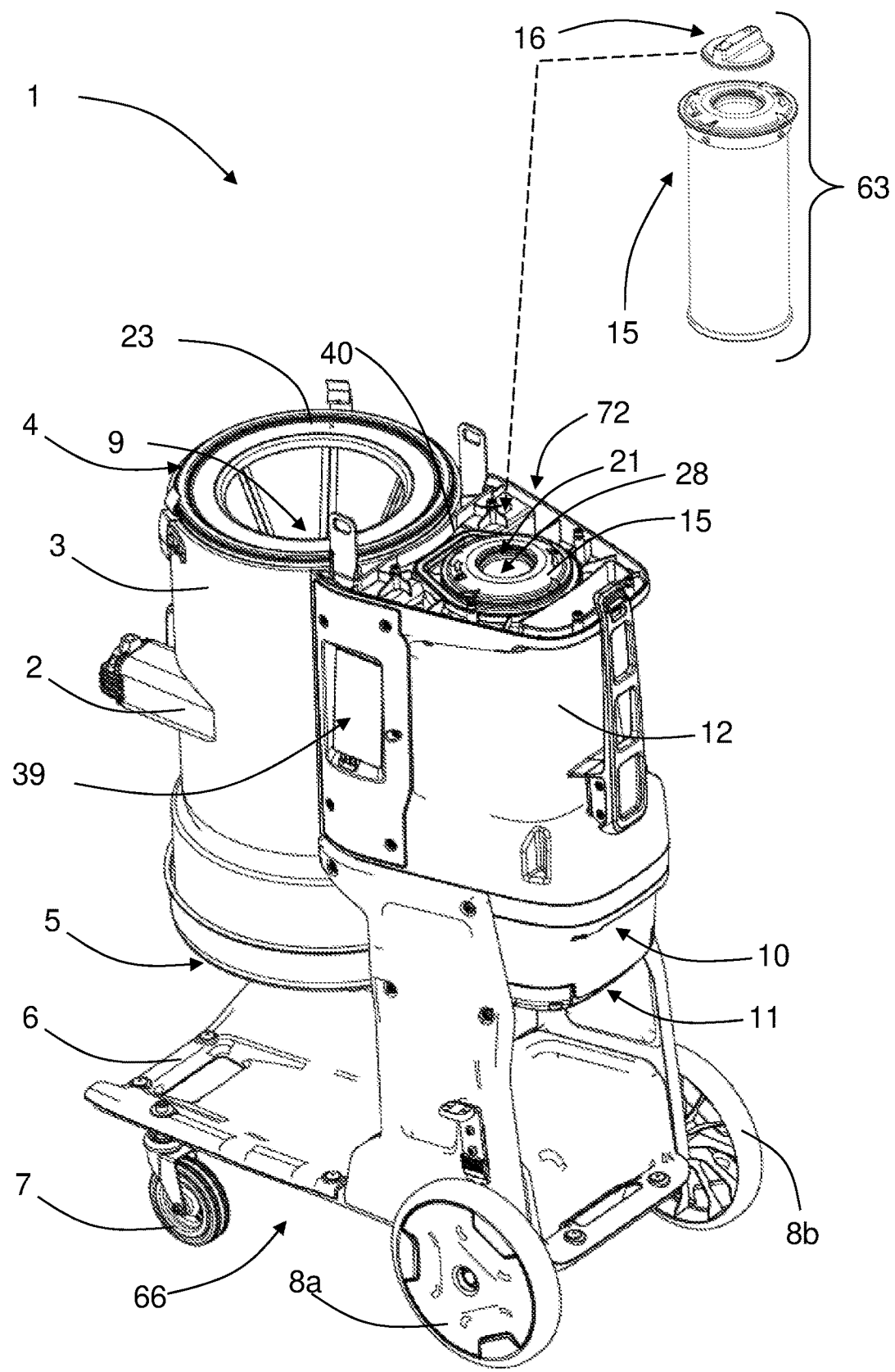
FIG. 4 shows a perspective rear view of the dust extractor without the lid parts.
Figure 5:
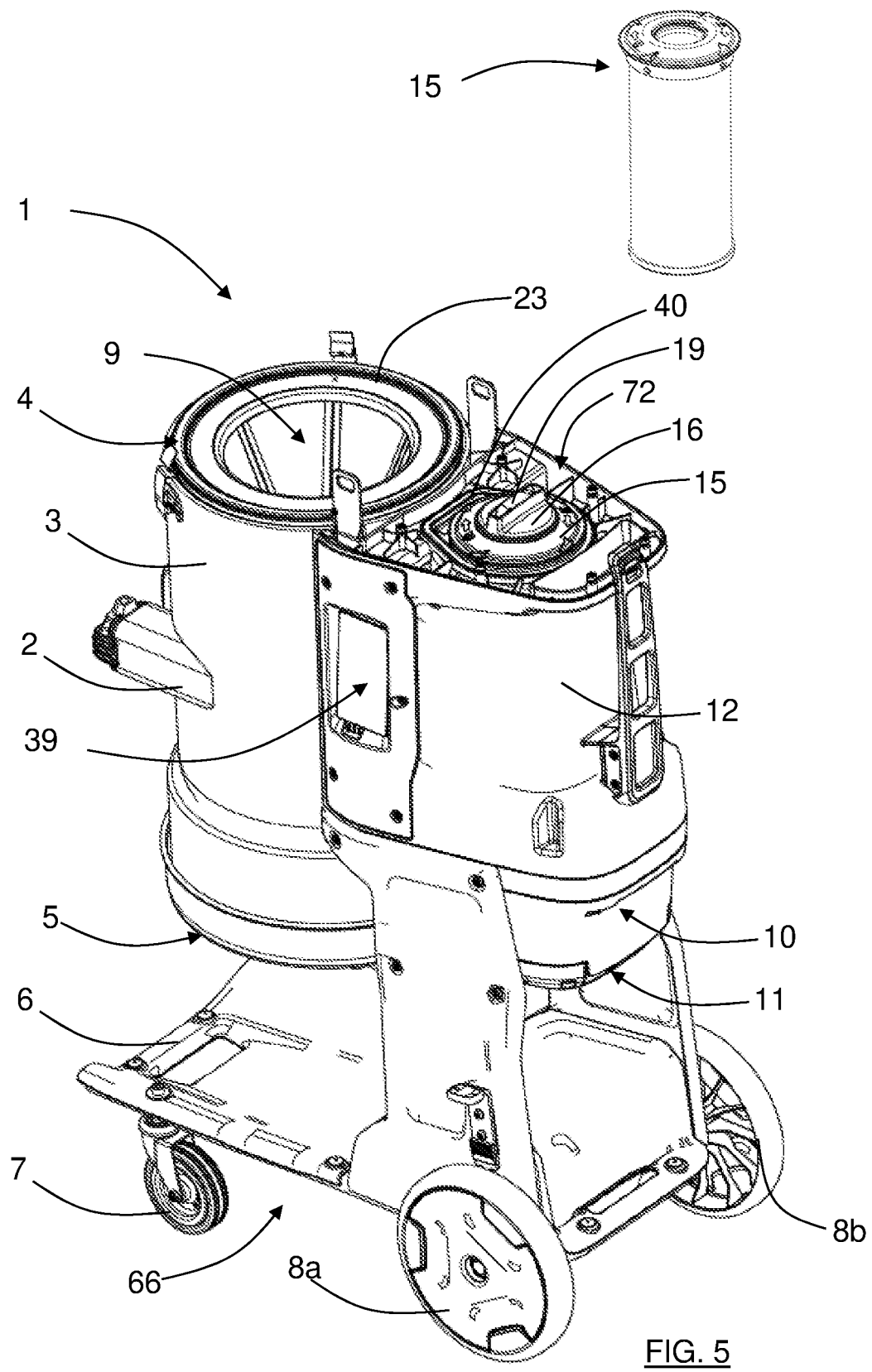
FIG. 5 shows the view of FIG. 4 with a filter lid attached to a fine filter part.
Figure 6:
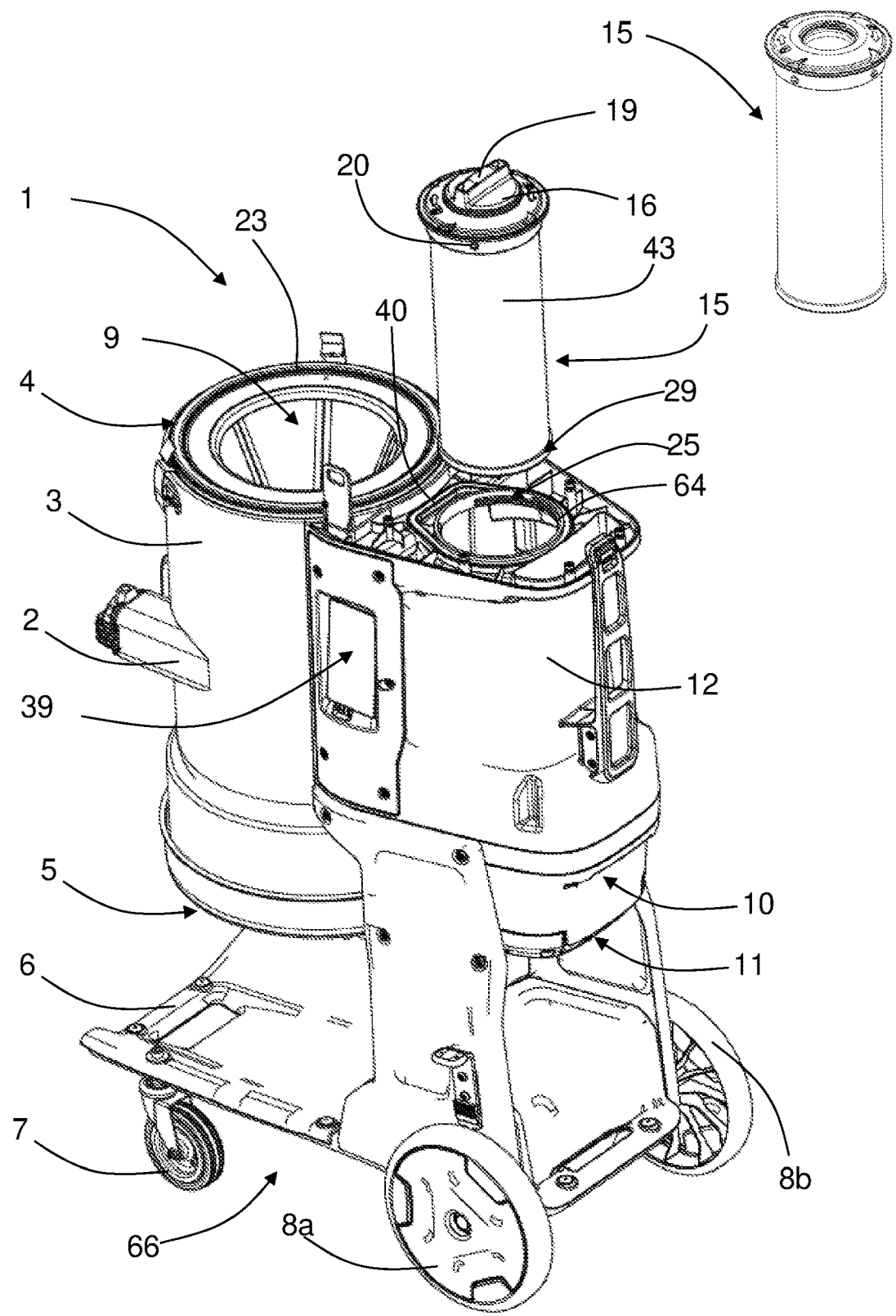
FIG. 6 shows the view of FIG. 4 with the fine filter part removed.
Figure 9:
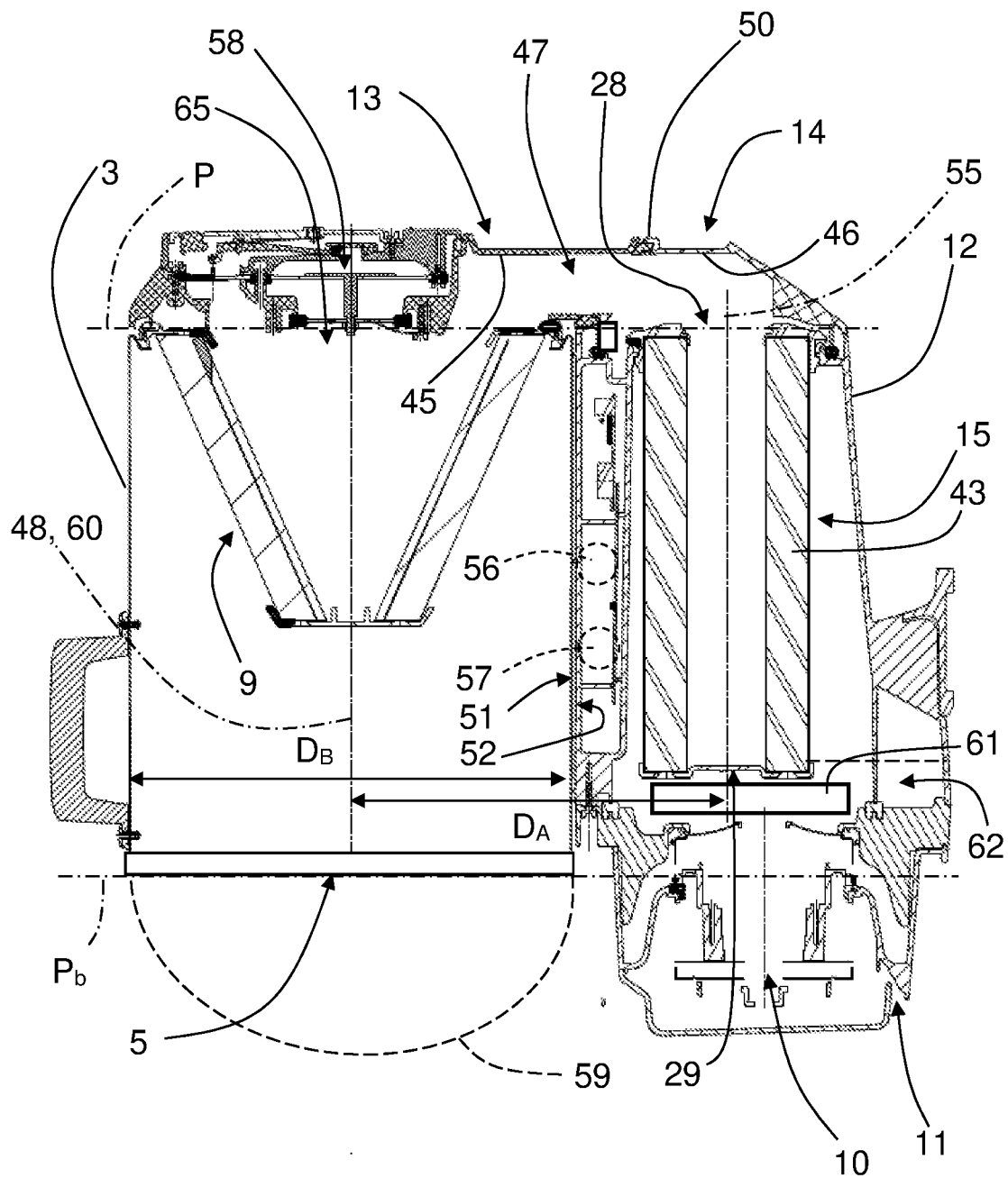
FIG. 9 shows a side section view of a dust cyclone container and a fine filter section.
Figure 10:
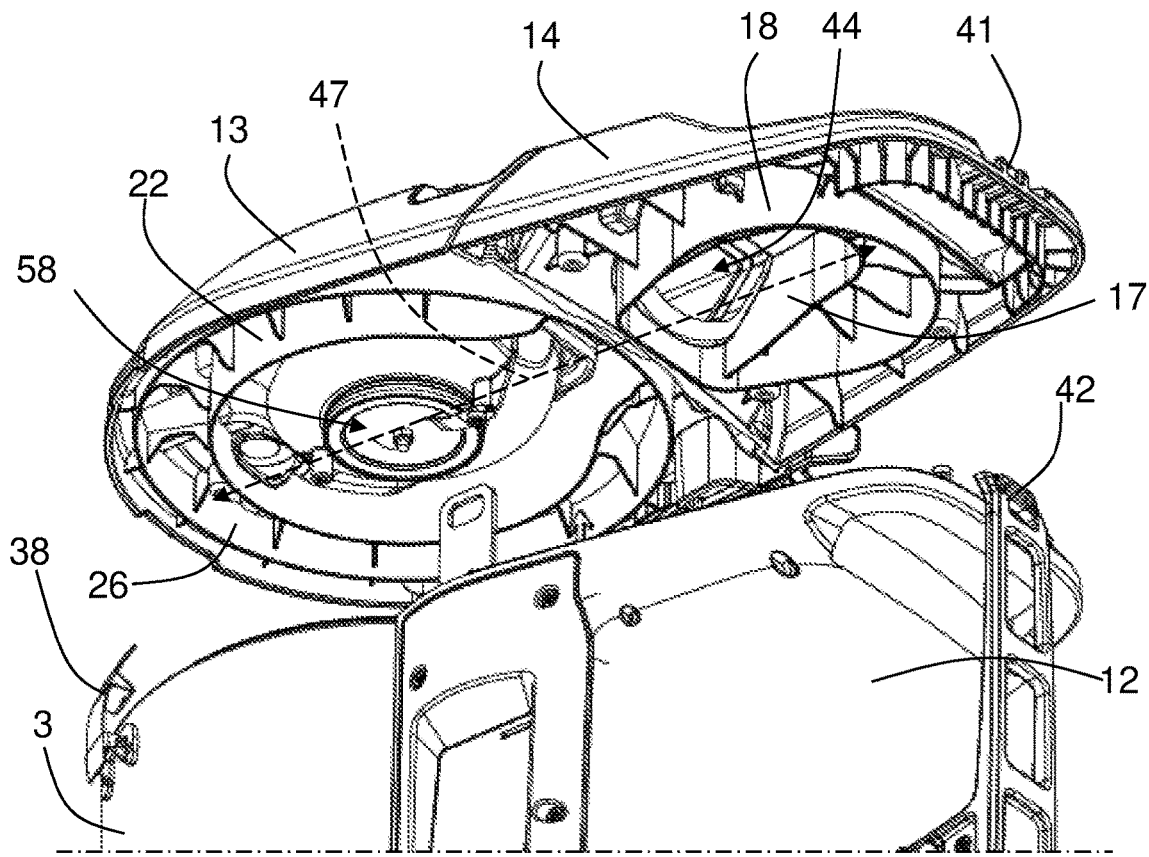
FIG. 10 shows a perspective bottom view of a lid arrangement.
Figure 11:
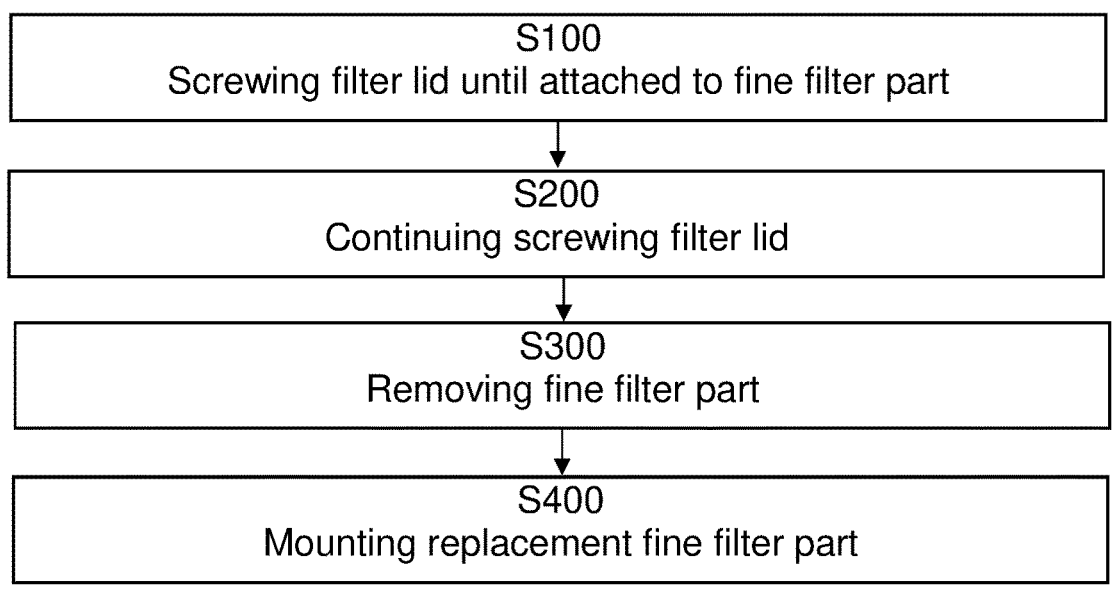
FIG. 11 shows a flowchart for methods according to the present disclosure.
Figure 12:
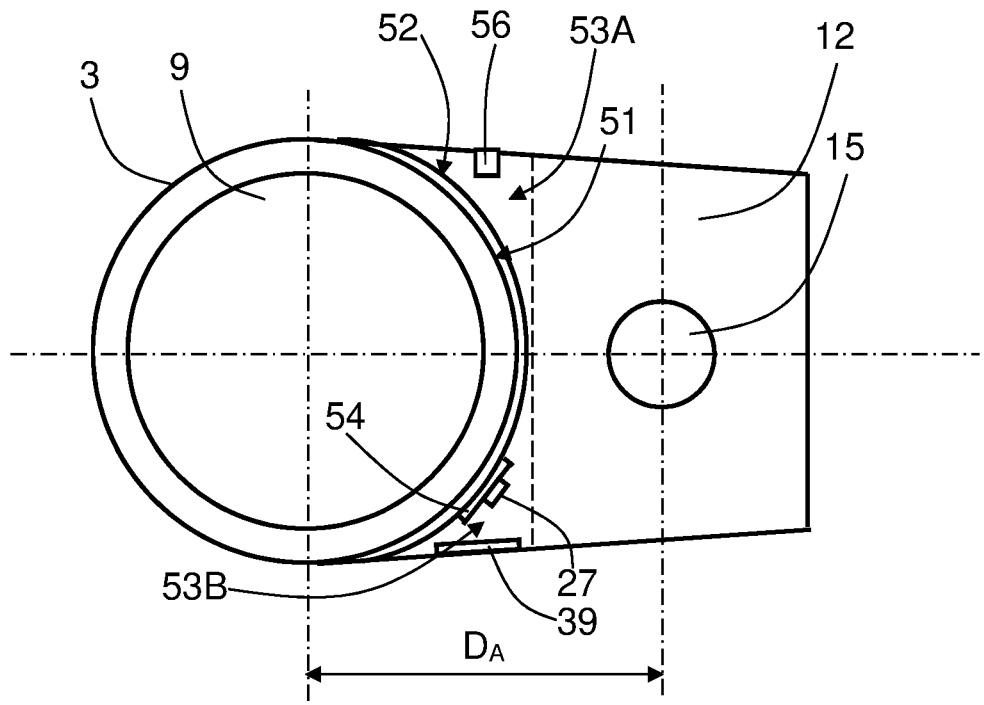
FIG. 12 shows a schematic top view of the dust extractor without lid arrangement.

FIG. 1, FIG. 2 and FIG. 3 show a front perspective side view of a dust extractor 1, and FIG. 4, FIG. 5 and FIG. 6 show a back perspective side view of the dust extractor 1. FIG. 9 shows a schematic side section view of a dust cyclone container and a fine filter section and FIG. 10 shows a bottom perspective view of lid parts 13, 14. The dust extractor 1 comprises a dust inlet 2 leading to a dust cyclone container 3 having a top 4 and a bottom 5 and having an inserted coarse filter part 9, where the coarse filter part 9 has a clean side, downstream the coarse filter part 9, and a contaminated side, upstream the coarse filter part 9.

According to some aspects, the dust cyclone container preferably has a generally cylindrical shape, on the outside as well as on the inside, and according to some further aspects, the coarse filter part 9 has a conical shape, preferably the coarse filter part 9 is shaped like a truncated cone, where the cone base is directed upwards in a normal operative position of the dust extractor 1. The terms clean and contaminated should in this context be regarded as relative to each other.

The dust extractor 1 further comprises a frame 6 and wheels 7, 8a, 8b connected to the frame 6, where the frame 6 and the wheels 7, 8a, 8b constitute a mobility section 66 that is connected to a fine filter section 12 and the dust cyclone container 3, where fine filter section 12 has a top 72, indicated in FIGS. 3-5, and comprises a motor 10 with an air outlet 11, the motor 10 preferably being constituted by a blower motor, but also can be being constituted by a fan motor that has less power than a blower motor. The mobility section 66 is attached to, and preferably releasably attached to, the fine filter section 12 by e.g. rotary fasteners and the fine filter section 12 is attached to, and preferably releasably attached to, the dust cyclone container 3 by e.g. rotary fasteners.

Figure 7:
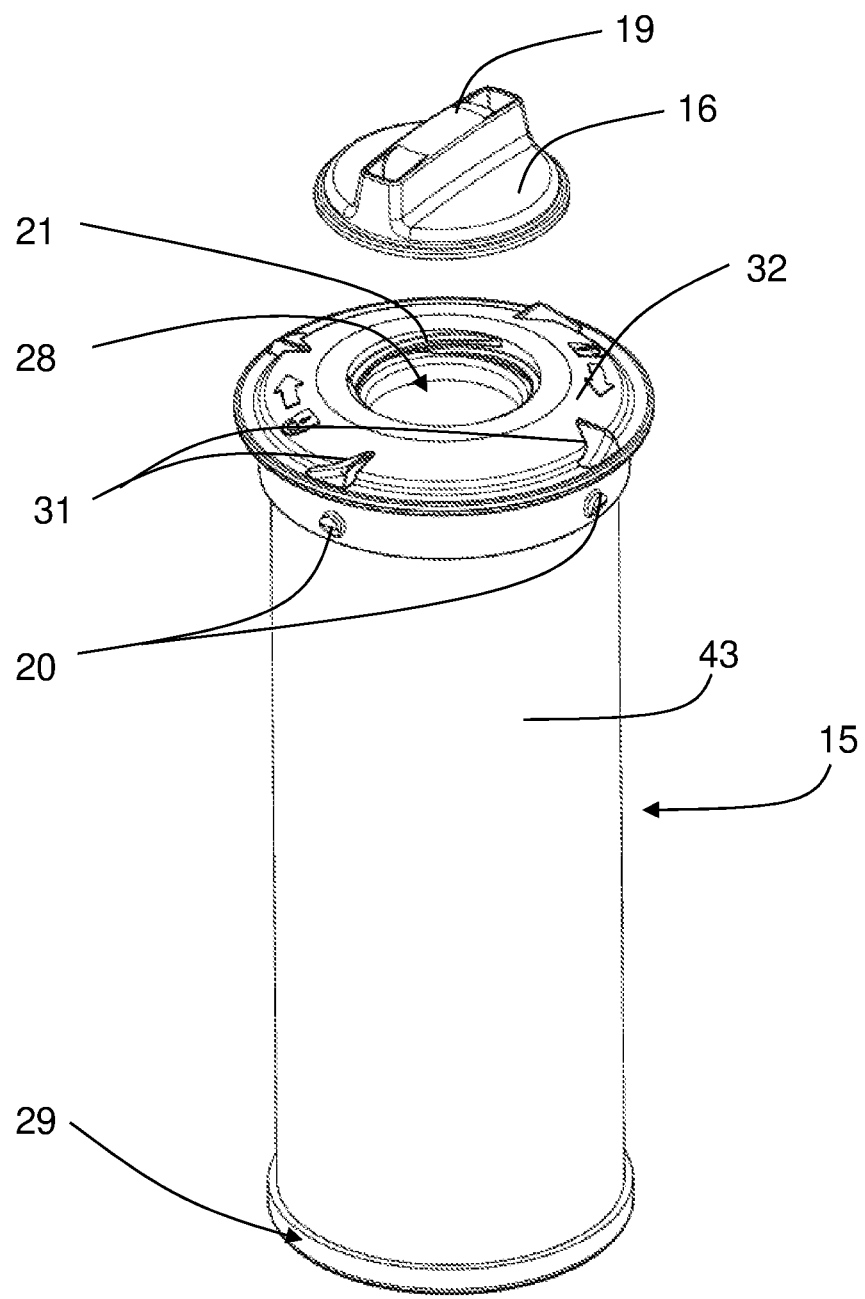
FIG. 7 shows a perspective top view of a fine filter part and a lid part.

In the following examples, the motor is assumed to be a blower motor 10. According to some aspects, in this example, the dust cyclone container 3 is fluidly connected to the air outlet 11 via a first lid part 13, a second lid part 14, and the fine filter section 12, where the fine filter section 12 has an inserted fine filter part 15 which according to some aspects has a generally cylindrical shape. In the Figures, only one smaller wheel 7 is shown, although there are two smaller wheels 7 where one is hidden. The fine filter part 15 is constituted by a filter cylinder that comprises a filter material 43, indicated in FIG. 6-9, and has, as indicated in FIG. 4, FIG. 7 and FIG. 9, an opening 28 in one end of the filter cylinder and a bottom 29 that is opposite the opening 28, i.e. located in the other end of the filter cylinder. The fine filter part 15 and thus the filter material 43 also comprises a clean side, downstream the fine filter part 15, and a contaminated side, upstream the fine filter part 15, where the opening 28 is facing the contaminated side. The coarse filter part 9 is adapted to enable passage of dust particles that are retained by means of the fine filter part 15.

In FIG. 1, both lid parts 13, 14 are in place and closed, in FIG. 2, the first lid part 13 is opened, and in FIG. 3, the first lid part 13 is removed and the second lid part 14 is lifted off the fine filter section 12. In FIG. 4, the lid parts 13, 14 are removed, in FIG. 5, a filter lid 16 is mounted to the fine filter part 15, and in FIG. 6, the fine filter part 15 is removed from the fine filter section 12.

According to some aspects, the lid parts 13, 14 form a lid arrangement 13, 14 that is arranged to cover a top 4 of the dust cyclone container 3 and the top 72 of the fine filter section 12, in a normal operative configuration of the dust extractor 1.

Figure 15:
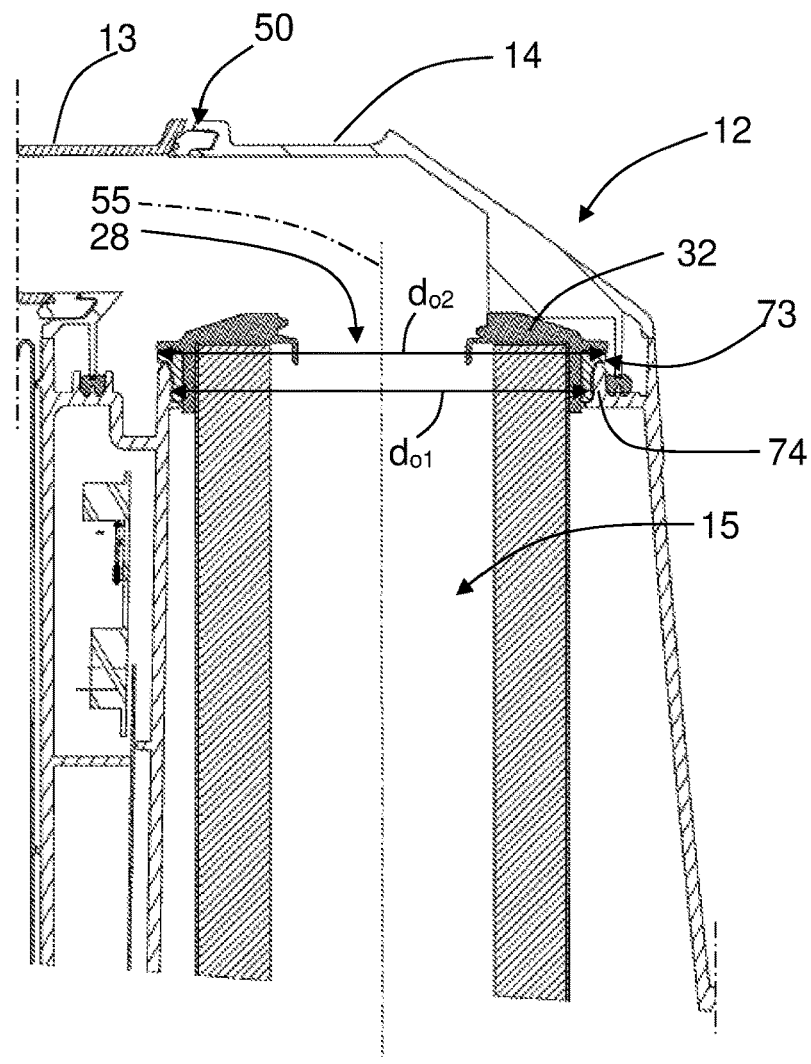
FIG. 15 shows a section side view of an upper part of an alternative fine filter part mounted to the fine filter section.
Figure 16:
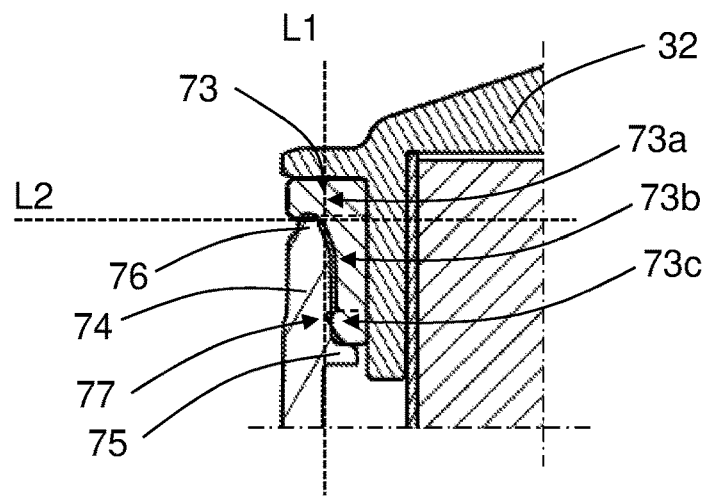
FIG. 16 shows an enlarged part of FIG. 15, disclosing details of a seal fine filter part seal and a fine filter section edge part.

According to the present disclosure, the first lid part 13 comprises a first air flow containing part 26, indicated in FIG. 2 and FIG. 10, and the second lid part 14 comprises a second air flow containing part 18, indicated in FIG. 10, where the air flow containing parts 26, 18 are adapted to be comprised in an air channel 47, indicated in FIG. 9 and FIG. 10, that connects the dust cyclone container 3 to the fine filter section 12 when the lid parts 13, 14 are mounted as shown in FIG. 1. An advantage with the second air flow containing part 18, when used together with a fine filter comprising axial and radial seals with no outer threads, as illustrated in FIGS. 15 and 16, is that the second air flow containing part 18 presses against the fine filter opening when the lid is closed. This means that the fine filter is pressed into position in the fine filter section by the lid as the lid is closed. Thus, even if an operator has not correctly inserted the fine filter all the way into the fine filter section, the fine filter will still enter into sealing position as the lid is closed.

The air flow containing parts 26, 18 constitute walls 18, 26 for an air channel between the dust cyclone container 3 and the fine filter section 12, more specifically, between the clean side of the coarse filter part 9 and the contaminated side of the fine filter part 15. According to some aspects, these walls 18, 26 mainly extend parallel to a center axis 48 of the dust cyclone container 3, indicated in FIG. 9. According to some aspects, advantageously, these walls 18, 26 mainly extend parallel to a center axis 55 of the fine filter part 15, indicated in FIG. 9.

According to some aspects, the first air flow containing part 26 is in the form of a first circumferentially running outer wall adapted to seal against a cyclone sealing rim 23 of the dust cyclone container 3 such that dust and air that moves from the coarse filter part 9 is enclosed by the first air flow containing part 26 and is guided towards and into the second air flow containing part 18 via a first aperture 24 in the first air flow containing part 26.

According to some aspects, the second air flow containing part 18 is in the form of a second circumferentially running outer wall adapted to seal against a first fine filter section sealing rim 40 that surrounds the fine filter part 15, where the second circumferentially running outer wall comprises a second aperture 44, indicated in FIG. 2, FIG. 3 and FIG. 10.

According to some aspects, as indicated in FIG. 2, the first lid part 13 has a first opening 35 that is adapted to face a second opening 36 in the second lid part 14 when the lid parts 13, 14 are mounted. According to some aspects, the first aperture 24 leads to the first opening 35, where the second opening 36 leads to the second aperture 44. According to some aspects, there is a lid seal 37 between the first opening 35 and the second opening 36, in this example the lid seal 37 is positioned at the second opening 36. According to some aspects, there may be an intermediate part positioned between the first opening 35 and the second opening 36. The intermediate part may be fixed to the fine filter section 12. The intermediate part may include at least one seal.

The air channel 47 runs between the cyclone sealing rim 23 and the first fine filter section sealing rim 40, and thus connects the clean side of the coarse filter part 9 with the contaminated side of the fine filter part 15. Preferably, interior surfaces of each of the first- and second lid part 13, 14 make up interior walls of the air channel 47, wherein the interior walls comprise the air flow containing parts 26, 18 as well as ceiling portions 45, 46 of the lid parts 12, 13. The air channel is arranged to define a flow path for the air and fine dust that has passed the coarse filter part 9 when the dust extractor 1 is in operation.

In this way, a compact and integrated air channel 47 is provided and connects the dust cyclone container 3 to the fine filter section 12 when the lid parts 13, 14 are mounted as shown in FIG. 1, dispensing with the need for a separate air/dust hose or any other type of protruding arrangement with separate parts. In the above example, the interior walls 26, 18 which are positioned radially within outer walls of the lid parts 12, 13, comprise the air flow containing parts 26, 18. Alternatively, according to some aspects, the air flow containing parts 26, 18 are constituted by outer walls of the lid parts 12, 13, not being constituted by separate walls. The lid parts 13, 14 then form interior walls for the channel 47.

According to some aspects, the first lid part 13 comprises a first air guiding part 22 and the second lid part 14 comprises a second air guiding part 17. The first air guiding part 22 is in the form of a partially circumferentially running wall that is running radially within the first air flow containing part 26. The first air guiding part 22 and the first air flow containing part 26 at least partially surround the center axis 48 of the dust cyclone container 3, and extend in a direction parallel to the center axis 48 of the dust cyclone container 3. The second air guiding part 17 is in the form of a partially circumferentially running wall that is running radially within the second air flow containing part 18. The air guiding parts 22, 17 are adapted to reduce turbulence in the air flow, which leads to that the air resistance is lowered.

According to some aspects, the first air guiding part 22 and the first air flow containing part 26 are one and the same item, and according to some further aspects the second air guiding part 17 and the second air flow containing part 18 are the same item. In the case of the air flow containing parts 26, 18 being constituted by outer walls of the lid parts 12, 13, not being constituted by separate walls, the lid parts 13, 14 can according to some aspects comprise one of the air guiding parts 22, 17, or both.

According to some aspects, the lid arrangement 13, 14 is provided with interior wall formations 17, 22, 18, 26 located radially inwards and separated from outermost interior walls of the lid arrangement 13, 14, wherein in the operative closed configuration of the lid arrangement 13, 14, the first wall formations 22, 26 comprising at least one wall having a partially circumferential configuration around the center axis 48 of the dust cyclone container 3 and extend essentially in a direction parallel to the center axis 48 of the dust cyclone container 3. The second wall formations 17, 18 comprise at least one wall having a partially circumferential configuration around the center axis 55 of the fine filter part 15 and extend essentially in a direction parallel to the center axis 55 of the fine filter part 15 when the fine filter part 15 is mounted to the fine filter section 12.

During operation, the blower motor 10 sucks dust and air into the dust cyclone container 3 via the dust inlet 2 to which a dust hose can be attached. In the dust cyclone container 3, relatively heavy dust will fall downwards towards the bottom 4 where it can be collected in a suitable dust container, for example an air-tight bag 59, schematically indicated in FIG. 9, that can be made in plastic, then constituting a barrier towards the ambient atmospheric pressure during operation. According to some aspects, the bag 59 is comprised in an elongated rolled-up or folded plastic tube that gradually is manually unrolled or unfolded when one bag is to be changed. Each bag is closed at its bottom with a bottom sealing clamp or strip of a suitable type. The dust container 59 can according to some aspects be in the form of a flexible dust bag or a rigid box for collecting relatively coarse dust, Relatively light dust will be sucked towards the top 4 and the inserted coarse filter part 9 that is used for filtering relatively coarse dust particles in order to spare the fine filter part 15 from these relatively coarse dust particles that otherwise quickly would clog the fine filter part 15. The relatively fine dust particles that pass the coarse filter part 9 are sucked towards the fine filter part 15 where these dust particles, which can be hazardous, are retained. The filtered air is then exhausted via the air outlet 11.

According to some aspects, the lid parts 13, 14 form a lid arrangement 13, 14 that is adapted to be positioned over the dust cyclone container 3 and the fine filter section 12. Generally, the lid arrangement 13, 14 can be constituted by one or more lid parts, not being limited to the two lid parts 13, 14 in the example.

According to some aspects, instead of the previously described lid parts 13, 14, there can be one single lid part that is mounted to both the dust cyclone container 3 and the fine filter section 12, for example by means of rotary fasteners such as screws, nuts and bolts. Preferably, such a single lid part has a horizontal main extension that is orthogonal to the center axis 48 of the dust cyclone container 3 when mounted to the dust extractor 1 in its operative position.

According to some aspects, a first distance $D_A$ is the shortest distance between a center axis 60 of the course filter part 9 and a center axis 55 of the fine filter part 15 and falls below a maximum interior diameter $D_B$ of the dust cyclone container 3. According to some aspects, the first distance $D_A$ is the shortest distance between the the center axis 48 of the dust cyclone container 3 and the center axis 55 of the fine filter part 15. According to some aspects, the first distance $D_A$ falls below the maximum interior diameter $D_B$ by a factor 1,2 such that $D_A<1,2\ D_B$. According to some aspects, alternatively, $D_A<1,1\ D_B$ or $D_A<1,0\ D_B$. This compact structure is enabled by the lid arrangement 13, 14 according to the present disclosure. Here, the center axis 60 of the course filter part 9 coincides with the center axis 48 of the dust cyclone container 3. This need not be the case, and any one, or both, of the center axis 60 of the course filter part 9 and the center axis 55 of the fine filter part 15 may be inclined with respect to the center axis 48 of the dust cyclone container 3. In the case where at least one of the center axis 60 of the course filter part 9 and the center axis 55 of the fine filter part 15 is inclined with respect to the center axis 48 of the dust cyclone container 3, the first distance $D_A$ is the shortest distance between the center axis 60 of the course filter part 9 and the center axis 55 of the fine filter part 15 along the extensions of the filter parts 9, 15. In this example, the center axis 60 of the course filter part 9, the center axis 55 of the fine filter part 15 and the center axis 48 of the dust cyclone container 3 are shown to run mutually parallel, but as mentioned above this is not necessary.

According to some aspects, the coarse filter part 9 comprises an opening 65 facing the clean side of the coarse filter part 9. According to some aspects, the opening 65 of the coarse filter part 9 lies in a plane P that runs perpendicular to the center axis 48 of the dust cyclone container 3, and according to some further aspects the opening 28 of the fine filter part 15 also lies essentially in the plane P. According to some aspects, the center axis 48 of the dust cyclone container 3 and the center axis 55 of the fine filter part 15 run parallel as shown in FIG. 9.

According to some aspects, the opening 28 of the fine filter part 15 lies a certain distance away from the plane P, where that distance falls below 0.3 times the length of the fine filter part 15 along the center axis 55 of the fine filter part 15, and according to some other aspects that distance falls below 0.1 times the length of the fine filter part 15 along the center axis 55 of the fine filter part 15.

According to some aspects, the first lid part 13 and the second lid part 14 are pivotally connected to each other. This is illustrated in FIG. 2, where the first lid part 13 is opened while the second lid part 14 remains closed, while the lid parts 13, 14 are connected to each other. Preferably, the first lid part 13 and the second lid part 14 are coupled to each other via a hinge 50 defining a pivot axis 49, such that the first lid 13 and the second lid 14 are pivotably coupled via said hinge 50 about said pivot axis 49. Preferably, the pivot axis 49 is arranged perpendicular to the center axis 48 of the dust cyclone container 3 when the second lid part 14 is attached to the fine filter section 12.

When the dust extractor 1 is in use, the first lid part 13 is attached to the dust cyclone container 3 and the second lid part 14 is attached to the fine filter section 12. The lid parts 13, 14 can be attached in different ways. Example of attachment means are screws and buckles, clamps, clips or hatches. According to some aspects, the first lid part 13 is attached to the dust cyclone container 3 by means of buckles 38 as indicated in FIG. 1, while the second lid part 14 is attached to the fine filter section 12 by means of screws. In this way, the first lid part 13 can be easily opened and raised as shown in FIG. 2, for example if the coarse filter part 9 need to be cleaned or replaced.

Thus, preferably, the method by which the first lid part 13 is attached to the dust cyclone container 3 and the method by which the second lid part 14 is attached to the fine filter section 12 are different. Preferably, the attachment method for attaching the second lid part 14 to the fine filter section 12 is more permanent than the attachment method for attaching the first lid part 13 to the dust cyclone container 3. According to some aspects, removing the second lid part 14 requires tools, such as a screw-driver or a wrench. Preferably, the attachment method for attaching the second lid part 14 includes rotary fasteners, such as screws, nuts and bolts.

According to some aspects, opening the first lid part 13 does not require tools. The attachment method by which the first lid part 13 is attached to the dust cyclone container 3 preferably comprises quick release fasteners such as buckles, clamps, clips or hatches, i.e. fasteners which do not require tools. Preferably, the first lid part 13 can be folded open about said pivot axis 50 for access to the coarse filter part 9 or e.g. maintenance while the second lid part 14 is still attached to the fine filter section 12.

With special reference to FIG. 10, the second lid part 14 comprises a hook part 41 that is adapted to be inserted into a receiving loop opening 42.

An advantage with the two-part lid illustrated in, e.g., FIG. 2, is that the first lid part can be arranged with a conveniently releasable fastening mechanism, such as the buckles 38, while the second lid part can be provided with a more secure fastening arrangement, such as the above-mentioned screws. This way an operator is less likely to accidentally expose the fine filter section and come into contact with the potentially harmful particulate matter trapped in the fine filter 15. The operator will, however, have no difficulty in accessing the fine filter when so desired, since the screws may still be easily released, just not accidentally.

Figure 17A:
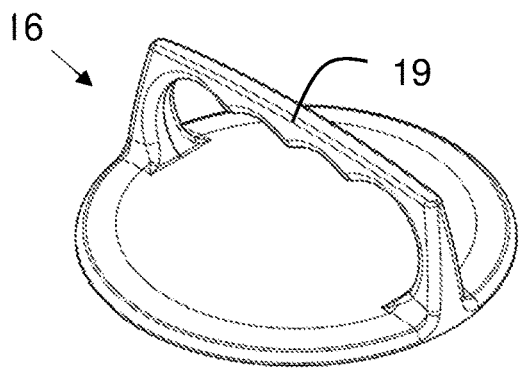
FIGS. 17A-C show a filter lid part.

As will be discussed in more detail below in connection to FIGS. 17A-C, the fine filter 15 may be equipped with a lid 16 having a handle part 19 which extends in a direction normal to the plane P (shown in FIG. 9) when the filter is received in the fine filter section 12. The extension of the handle part may advantageously be configured sufficiently large so as to make contact with the second lid part before the second lid part enters into sealing position. Thus, the second lid part cannot be closed as long as the lid 16 is still in sealing position with respect to the fine filter part, rendering the machine inoperable unless the fine filter part is correctly installed in the dust extractor 1, without the lid 16 present.

According to some aspects, opening the first lid part 13 provides direct access to the coarse filter part 9 and opening the second lid part 14 provides direct access to the fine filter part 15. Removing the lid arrangement 13, 14 provides direct access to both filter parts 9, 15.

According to some aspects, as shown in FIG. 12 and FIG. 13A-13C, the fine filter section 12 has a complementary shape in relation to the dust cyclone 3 container, such that a first volume 53A and a second volume 53B is formed within the fine filter section 12. These volumes can comprise several parts such as an electronic unit that comprises a circuit board 54, a control unit 27, other electric and electronic components, necessary cabling and a user interface in the form of an operator panel 39 as also indicated in FIG. 1-6. As indicated in FIG. 12 and FIG. 13A-13C, there are two coherent volumes 53A, 53B alternatively the volumes 53A, 53B are separated. Part and components can have different placings in the volumes 53A, 53B, only examples are illustrated in the drawings.

According to some aspects, more in detail, the dust cyclone container 3 and the fine filter section 12 are arranged adjacent each other, such that a first outer surface 51 of the dust cyclone container 3 and a second outer surface 52 of the fine filter section 12 are arranged to oppose each other. According to aspects, the first and second outer surfaces 51, 52 have complementary shapes. Preferably, the first and second outer surfaces 51, 52 are cylindrical, and the first outer surface 51 has a convex configuration and the second outer surface 52 has a concave configuration. The concave configuration of the second outer surface 52, creates an internal space, said volumes 53A, 53B, for the fine filter section 12 on each lateral side of the dust cyclone container 3. According to aspects, at least one of these volumes 53A, 53B, in this example the second volume 53B, accommodates electronics such as at least part of at least one of said control unit 27, circuit board 54 and cabling. According to aspects, a user interface in the form of said operator panel 39 for communication with an operator is arranged on an outer side of the fine filter section 12, overlapping at least partly with the second volume 53B of the fine filter section 12 as seen in a direction perpendicular to a plane defined by the center axis 48 of the cyclone dust container 3 and the center axis 55 of the fine filter part 15.

According to further aspects, a power inlet 56 for powering the dust extractor 1 and possibly a power outlet 57 for powering a dust emitting power tool is arranged on an outer side of the fine filter section 12 overlapping at least partly with the first volume 53A of the fine filter section 12 as seen in a direction perpendicular to a plane defined by the center axis 48 of the cyclone dust container 3 and the center axis 55 of the fine filter part 15. Preferably, the operator panel 39 and the power inlet 56 are located on opposite lateral sides of the fine filter section 12. Preferably, the operator panel 39 and the power outlet 57 are located on opposite lateral sides of the fine filter section 12. According to aspects, the fine filter section 12 is arranged attached to the dust cyclone container 3 by fasteners, such as screws, nuts and bolts.

According to some aspects, the first lid part 13 is provided with a relief valve arrangement comprising a relief valve 58, wherein the relief valve 58 is arranged integrated in the first lid part 13. The relief valve 58 may be fully automatic or manually operated. The relief valve 58 may be mechanically or electrically operated. Preferably, the relief valve 58 is fully mechanical such that the first lid part 13 is free from cabling and electronics. Opening of the relief valve 58 enables air from the ambient to enter via the relief valve 58 into the clean side of the coarse filter part 9 in the dust cyclone container 3 such that it enables cleaning of the coarse filter part 9, more specifically, increasing the pressure to a degree enabling dust attached to the contaminated side of the coarse filter part 9 to be released from the coarse filter 9.

Thereby, the time between manual filter cleaning or replacement can be prolonged. Preferably, the relief valve 58 is arranged on the first lid part 13 in the region of the center axis 48 of the dust cyclone container 3 when the first lid part 13 is in its closed operative position. According to some aspects, the relief valve 13 automatically senses when the resistance for the air flowing through the coarse filter part 9 has become too great, i.e. above a first threshold level for air resistance, and then the relief valve 58 is configured to be opened until the air resistance is below the first threshold level. Alternatively, the relief valve 58 is configured to alternate between open and closed until the air resistance is below the first threshold level. Alternatively, the relief valve 58 is configured to be opened, or alternated, until the air resistance is below a second threshold level, different from the first threshold level.

Figure 8:
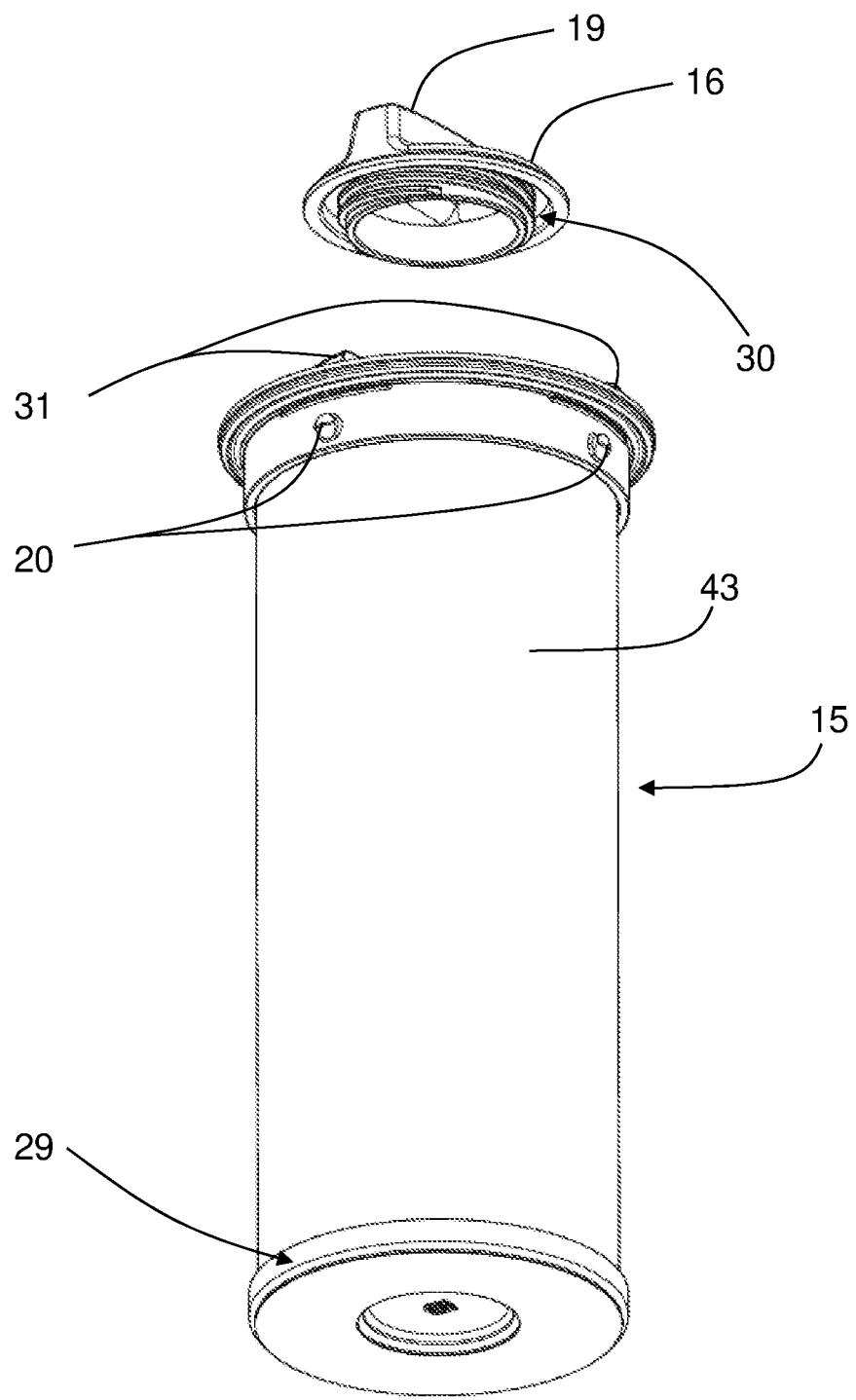
FIG. 8 shows a perspective bottom view of a fine filter part and a lid part.

Furthermore, in accordance with the present disclosure, with reference also to FIG. 7 and FIG. 8, the filter lid 16 is adapted to be mounted to the fine filter part 15 and sealing the opening 28 before removal of the fine filter part 15 from the fine filter section 12. In this way, when handling the fine filter part 15, release of harmful particles is prevented, such that a secure disposal of the used fine filter part is enabled as illustrated in FIG. 6.

According to some aspects, the filter lid 16 comprises a handle 19 such that a user is enabled to lift and handle the fine filter part 15 by means of the handle 19 when the filter lid 16 is mounted to the fine filter part 15.

According to some aspects, the fine filter part 15 comprises filter mounting thread means 20, indicated in FIG. 6, FIG. 7 and FIG. 8, which are adapted to engage corresponding filter section thread means 25, indicated in FIG. 6, in the fine filter section 12 when the fine filter part 15 is mounted to the fine filter section 12.

Figure 17B:
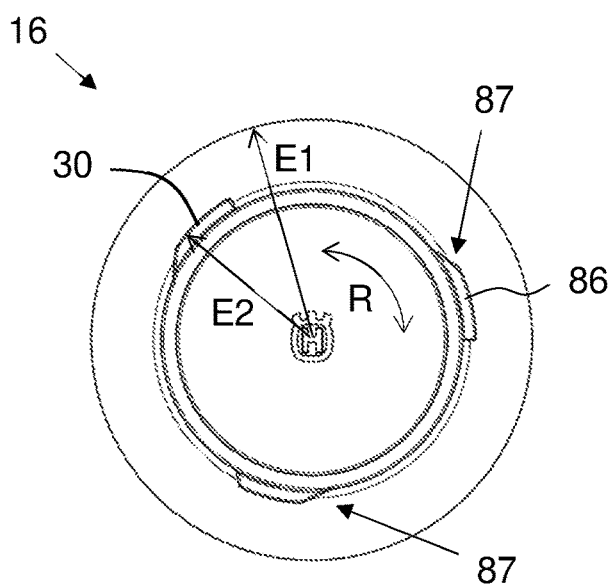
Figure 17C:
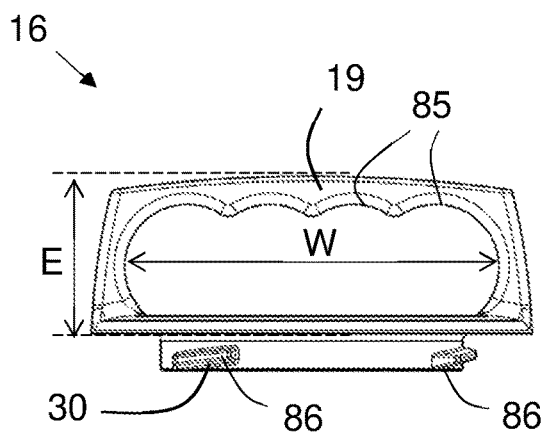
Figure 19:
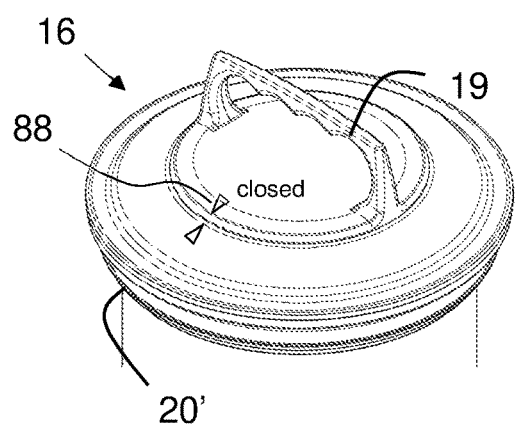
FIG. 19 shows a fine filter with a filter lid part.

FIGS. 17A-C, 18 and 19 illustrate an example of the above-mentioned handle 19 on a filter lid 16. This handle is configured with an extension E orthogonal to a plane of the lid thread means 30 (i.e., orthogonal to the plane P shown in FIG. 9) sufficient to prevent closing of the second lid part 14 when the filter lid is still in place. The extension E may be on the order of 2-5 cm, and preferably about 3 cm. The handle aperture may be configured with a width W between 4-10 cm, and preferably about 7.5 cm, which allows an operator to hold the handle in a convenient and secure manner. To further improve operator comfort, the handle aperture may be configured with a shape matched to an operator hand. In the example of FIG. 17C, this shape comprises four finger-shaped grooves 85. More generally, the aperture may comprise an undulating and/or a scalloped shape matched to an operator hand.

Figure 18:
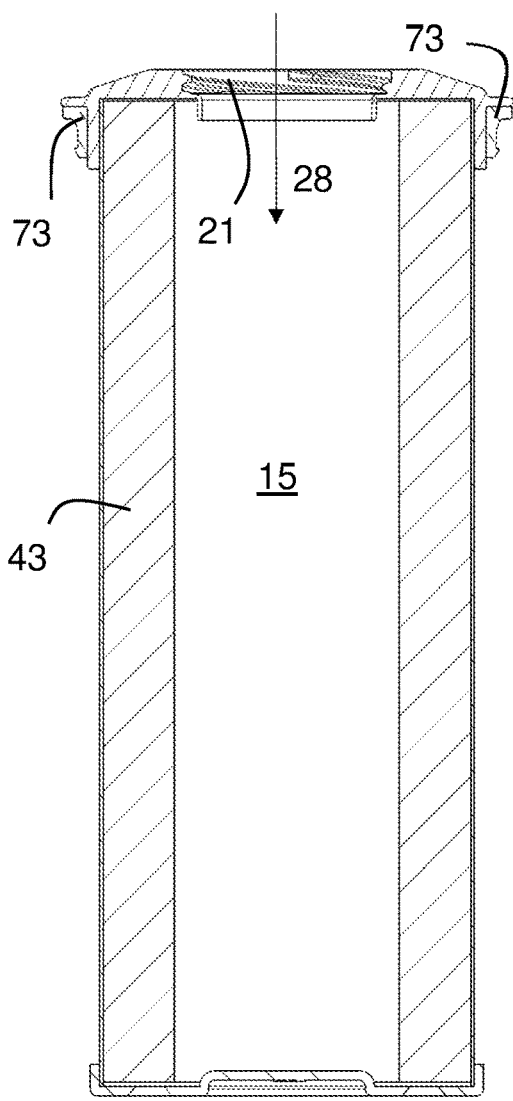
FIG. 18 shows a side view of a fine filter.

FIG. 18 illustrates an example of a fine filter part 15 that is adapted to be mounted to a fine filter section 12 of a dust extractor 1. The fine filter part 15 comprises an opening 28 of a particle containing space inside the fine filter part 15, and filter mounting engagement means 73 that are adapted for sealingly mounting the fine filter part 15 to an operational filtering position in the fine filter section 12. The filter also comprises filter closing thread means 21 that are adapted to engage corresponding filter lid thread means 30 of a filter lid 16. The lid extends radially with a distance E1 past the radial position E2 of the thread means 30. Optionally, a seal such as a gasket, can be assembled with the lid or with the fine filter.

The filter lid thread means 30 optionally comprises a right handed external thread, as illustrated in, e.g., FIG. 17B.

According to some aspects, the filter lid thread means 30 comprises at least two, and preferably three protrusions 86 configured as angled wings. These wings reduce friction compared to annular threads that extend around the entire perimeter of the lid. The reduced friction allows more convenient closing and opening of the lid. The protrusions may furthermore comprise a chamfered section in the closing direction, to simplify thread engagement as the lid engages the filter.

The filter lid thread means 30 is preferably configured with a thread pitch arranged to fully close the lid at a rotation R less than 180 degrees, and preferably less than 90 degrees, and more preferably less than 45 degrees. This means that an operator can close the lid without changing hold of the handle, which is an advantage.

The handle 19 and the thread means 30 are integrally formed with the lid 16 as a single piece. The lid may, e.g., be molded from a single piece of plastic and thus be manufactured in a cost efficient manner.

At least one marker 88 is optionally configured on the lid to indicate a closed lid position. The marker may be positioned such as to align with a corresponding marker on the filter when the lid is in sealing position. This way an operator can determine that the filter is properly sealed from visual inspection alone, which is an advantage.

According to some aspects, the filter lid 16 is adapted to be snapped in place when mounted to the fine filter part 15. The filter lid 16 is then at least partly made in a resilient material that has a certain flexibility allowing a snap-lock fit.

Figure 25:
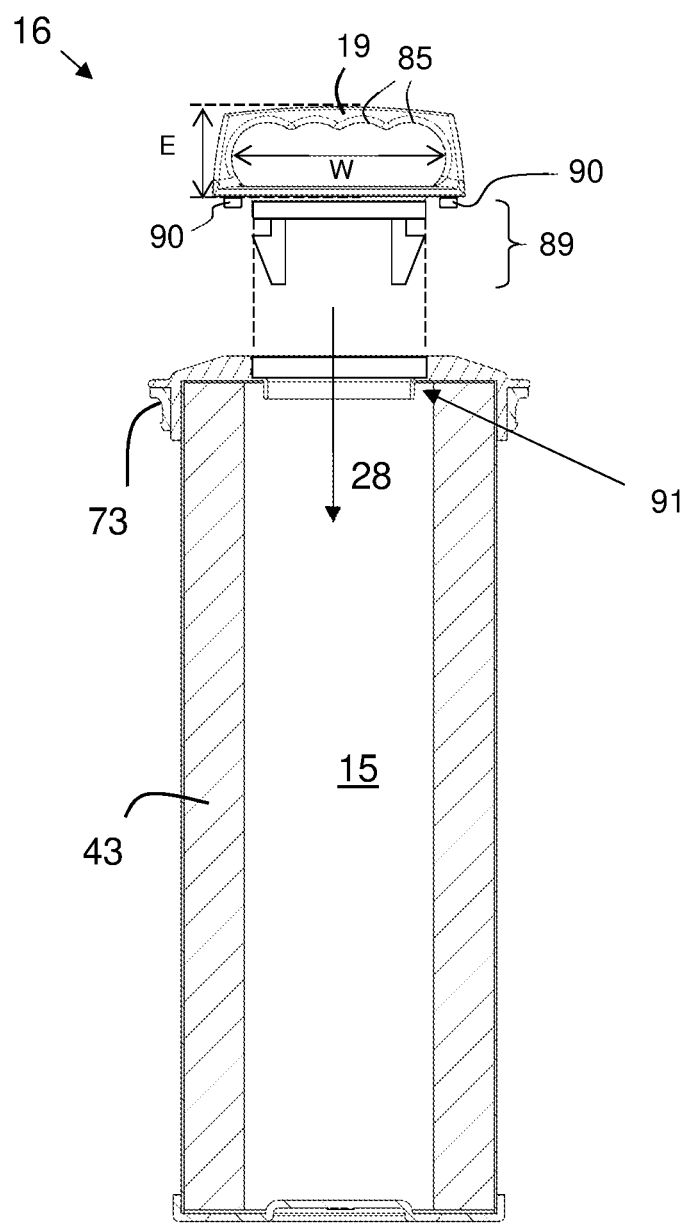
FIG. 25 shows a fine filter part with a filter lid part.

FIG. 25 illustrates an alternative filter lid closing mechanism which can be used with advantage together with a fine filter part 15 comprising the axial and radial seals 73. This filter lid closing mechanism is based on such a snap-lock mechanism 89 which is arranged to enter into locking position with the fine filter rim portion 91 when pushed into locking position. This snap-lock mechanism is difficult to open again, i.e., to release, once it has entered into locking position, which is an advantage since used fine filter parts may be dangerous to open, since this could potentially expose an operator to the harmful dust trapped inside the fine filter part.

According to some aspects, the fine filter part 15 comprises filter closing thread means 21 that are adapted to engage corresponding lid thread means 30, indicated in FIG. 8, when the filter lid 16 is mounted to the fine filter part 15.

The filter mounting thread means 20 are shown as outer thread means and the filter section thread means 25 are shown as inner thread means. The reverse is of course possible, as well as the inner/outer position of these thread means 20, 25. Here, the filter mounting thread means 20 are located at the opening 28, but could just as well be located at the bottom 29 of the fine filter section. The filter section thread means 25 are of course located correspondingly.

The filter closing thread means 21 are shown as inner thread means, and the lid thread means 30 are shown as outer thread means, the reverse is of course possible.

The thread means 20, 25; 21, 30 can be of many kinds, for example in the form of ordinary threads, as shown in this example, with reference to FIG. 6, FIG. 7 and FIG. 8, for the filter closing thread means 21 and the lid thread means 30, or in the form of a bayonet arrangement where bayonet pins 20 engage bayonet thread slots 25, as shown in this example for the filter mounting thread means 20 and the filter section thread means 25. In the example, according to a preferred embodiment, there are four circumferentially and symmetrically positioned radially protruding bayonet pins 20, generally there are at least three circumferentially and symmetrically positioned radially protruding bayonet pins 20. The threads may also be configured as angled wings, shown in FIG. 17B. There may be two or more such wings, and preferably three wings constituting the lid thread means 30.

In this way, when the filter section thread means 25 are constituted by bayonet thread slots 25, the bayonet pins 20 will meet a well-defined stop during tightening such that over-tightening is avoided. The filter mounting thread means 20 thus comprise bayonet pins 20 and the filter section thread means 25 comprise bayonet thread slots 25.

According to some aspects, the filter mounting thread means 20 and the filter section thread means 25 are adapted to be tightened in a first direction of rotation, and to be released in a second direction of rotation, opposite the first direction of rotation. The filter closing thread means 21 and the lid thread means 30 are adapted to be tightened in the second direction of rotation, and to be released in the first direction of rotation.

This means that, on one hand, the filter mounting thread means 20 and the filter section thread means 25, and on the other hand, the filter closing thread means 21 and the lid thread means 30, have mutually opposite thread directions.

Furthermore, this means that when the fine filter part 15 is about to be removed from the fine filter section 12, the lid parts 13, 14 are removed and the filter lid 16 screwed onto the fine filter part 15 by letting the lid thread means 30 engage the filter closing thread means 21 in the second direction of rotation such that the filter lid 16 becomes securely mounted to the fine filter part 15, closing the opening 28 such that harmful particles become contained within the fine filter part 15. When the filter lid 16 has been mounted to the fine filter part 15, the screwing of the lid can continue in the same direction, and now the fine filter part 15 becomes released from the fine filter section 12 since the filter mounting thread means 20 and the filter section thread means 25 are released from each other in the second direction of rotation.

In other words, the same rotation direction that secures the filter lid 16 to the fine filter part 15 releases the fine filter part 15 from the fine filter section 12, which ensures a smooth, safe and reliable removal of the fine filter part 15 as illustrated in FIG. 6.

According to some aspects, the first direction of rotation is clockwise, and the second direction of rotation is counterclockwise.

For the fine filter part 15, there are filter mounting thread means 20 that are adapted for mounting the fine filter part 15 to the fine filter section, and filter closing thread means 21 that are adapted to receive filter lid thread means 30.

According to some aspects, the filter mounting thread means 20 and the filter closing thread means 21 are adapted to be tightened in opposite directions.

According to some aspects, the fine filter part 15 comprises a filter rim 32 surrounding the opening 28, where the filter rim 32 comprises wedge-shaped protrusions 31 that enable a user to screw the fine filter part 15 in the first direction of rotation, enabling a user to easily mount the fine filter part 15 to the fine filter section 12. Other protrusion shapes are of course conceivable.

According to some aspects, the fine filter part 15 is in the form of a "High Efficiency Particulate Air" or "High Efficiency Particulate Arrestance" filter, normally referred to as a HEPA filter. Examples of suitable HEPA classes are class 13 and class 14. That means that the filter material 43 is a material that complies with these specifications. The HEPA filter is an example of an essential filter for an industrial grade dust extractor.

According to some aspects, the fine filter section 12 comprises a second fine filter section sealing rim 64, indicted in FIG. 6, that is adapted to seal against the filter rim 32 of the fine filter part 15 when the fine filter part 15 is mounted.

According to some aspects, with reference to FIG. 4-FIG. 8, the present disclosure relates to a fine filter part kit 63, indicated in FIG. 4, comprising a replacement fine filter part 15 and a filter lid 16. The replacement fine filter part 15 is adapted to be mounted to a fine filter section 12 for a dust extractor 1, and the filter lid 16 is adapted to be mounted to a corresponding used fine filter part 15 to be replaced, already mounted to the fine filter section 12, as illustrated in FIG. 4. When the filter lid 12 is mounted to the used fine filter part 15, as illustrated in FIG. 5, an opening 28 of a particle containing space inside the used fine filter part 15 is sealed before replacement of the used fine filter part 15. In this way, release of particles contained in the particle containing space into the ambient air is prevented and a secure disposal of the used fine filter part 15 is enabled when it is removed from the fine filter section 12 as illustrated in FIG. 6.

When the used fine filter part 15 has been removed, the replacement fine filter part 15 can be mounted to the fine filter section 12.

According to some aspects, with reference to FIG. 4-FIG. 11, the present disclosure relates to a method for handling a fine filter part 15 that is mounted in a fine filter section 12 in a dust extractor 1. The method comprises screwing S100 a filter lid 16, having filter lid thread means 30, onto the fine filter part 15, having filter mounting thread means 20 and filter closing thread means 21, by letting the filter lid thread means 30 engage the filter closing thread means 21 in the second direction of rotation, as discussed above, such that the filter lid 16 becomes attached to the fine filter part 15. The method further comprises continuing the screwing S200 of the filter lid 16 in the second direction of rotation such that the filter mounting thread means 20 and filter section thread means 25, comprised in the fine filter section 12, are released from each other enabling the fine filter part 15 to become released from the fine filter section 12, and removing S300 the fine filter part 15 from the fine filter section 12.

According to some aspects, the filter mounting thread means 20 and the filter section thread means 25 are released in the second direction of rotation and the filter lid thread means 30 and the filter closing thread means 21 are tightened in the second direction of rotation.

According to some aspects, the method further comprises mounting S400 a replacement fine filter part 15 to the fine filter section 12 by screwing the replacement fine filter part 15 in the first direction of rotation, opposite the second direction of rotation.

It is appreciated that the filter mounting thread means 20 are optional and may be replaced or at least complemented by the sealing gasket 73 discussed above in connection to FIGS. 16 and 17. In this case there is no need to perform a rotary action involving the filter in relation to the dust extractor 1, since the filter is just inserted into the fine filter section along its central axis 55 and removed by pulling the filter out along the same central axis 55 direction.

Thus, there is also disclosed herein a method for handling a fine filter part 15 that is mounted in a fine filter section 12 of a dust extractor 1. The method comprises screwing S100 a filter lid 16, having filter lid thread means 30, onto the fine filter part 15, having corresponding filter closing thread means 21, by letting the filter lid thread means 30 engage the filter closing thread means 21 such that the filter lid 16 becomes attached to the fine filter part 15). The method also comprises removing S300 the fine filter part 15 from the fine filter section 12 by pulling the filter lid 16 attached to the fine filter part 15 in direction of a center axis 55 of the fine filter part 15, out from the fine filter section 12.

There is furthermore disclosed herein a method for handling a fine filter part 15 that is to be mounted in a fine filter section 12 of a dust extractor 1. The method comprises obtaining a fine filter part 15 having filter closing thread means 21, wherein the fine filter part is sealed by a filter lid 16 having corresponding filter lid thread means 30 engaging the closing thread means 21, inserting the fine filter part 15 with the filter lid 16 into the fine filter section 12 of the dust extractor 1 in direction of a center axis 55 of the fine filter part 15, and removing the filter lid 16 from the fine filter part 15 by unscrewing the filter lid 16.

The present disclosure is not limited to the above examples but may vary freely within the scope of the appended claims. For example, the blower motor 10 may be powered by an external power source such as electrical mains via a power cord, or by means of an onboard power source such as a rechargeable battery. According to some aspects, the blower motor 10 can be powered both via an external power source and an onboard power source, either one at a time or on combination. Rechargeable batteries may be re-charged via the electrical mains both when the blower motor 10 is idle and when it is active, the electrical mains then being used for powering any one of the blower motor 10 and a battery charger, or both at the same time.

According to some aspects, the dust cyclone container 3 is not adapted to receive a coarse filter, instead the dust cyclone container 3 comprises a first cyclone and a swirl generator, where the first cyclone is integrated into a larger collection cyclone, which relieves the inner cyclone and its flow channels from the largest dust particles as well as larger items which can be sucked in as described in WO 2013052000. This arrangement dispenses with the need for a separate coarse filter. More than two cyclones is also conceivable. According to some aspects, a cyclone container is adapted to separate about 85% of the acquired dust. According to some aspects, there can be two or more dust cyclone containers with, or without a swirl generator.

According to some aspects, at least one of the cyclone sealing rim 23 and the first fine filter sealing rim 40 comprises a sealing item such as a rubber ring, or is in the form of a plastic rim. Generally, the sealing rims 23, 40 are constituted by channel connecting rims 23, 40 that need not have a completely sealing function. The air channel 47 is generally adapted to run between a cyclone channel connecting rim 23 and a fine filter section channel connecting rim 40, when the lid arrangement 13, 14 is mounted.

This means that, according to some aspects, the first air flow containing part 26 is in the form of a first circumferentially running outer wall adapted to seal against a cyclone channel connecting rim 23, and the second air flow containing part 18 is in the form of a second circumferentially running outer wall adapted to seal against a fine filter channel connecting rim 40 that surrounds the fine filter part 15.

The dust cyclone container 3 can also be referred to as a pre-filter unit. The fine filter part 15 can also be referred to as an essential filter. The coarse filter part 15 can also be referred to as a pre-filter part.

Figure 13A:
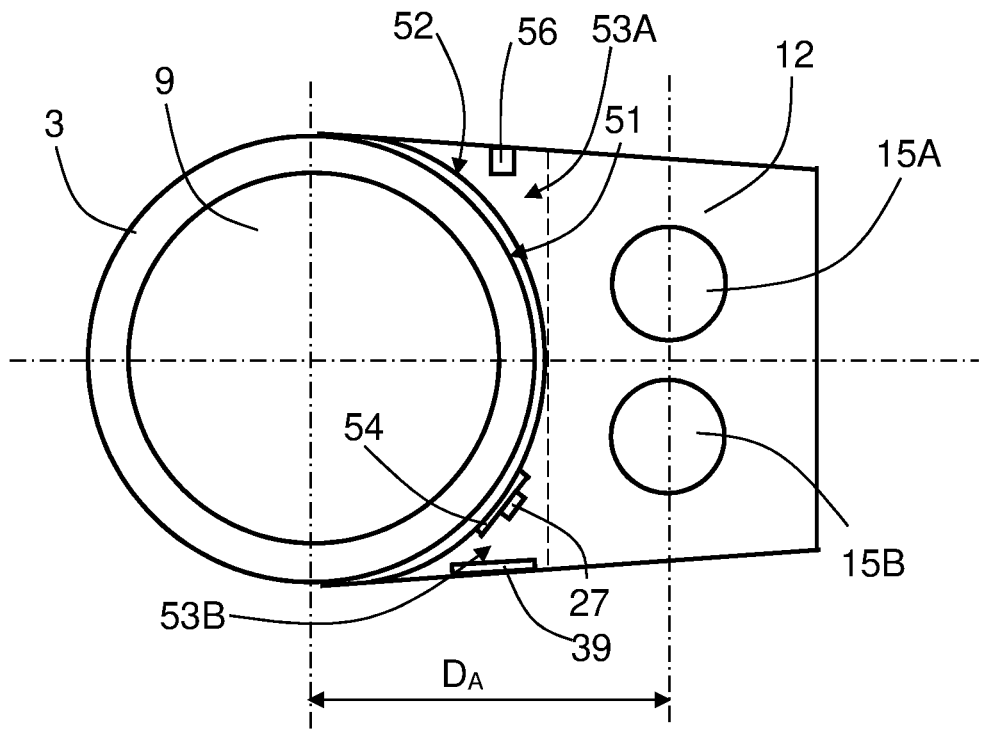
FIG. 13A shows a schematic top view of the dust extractor with two fine filter parts.
Figure 13B:
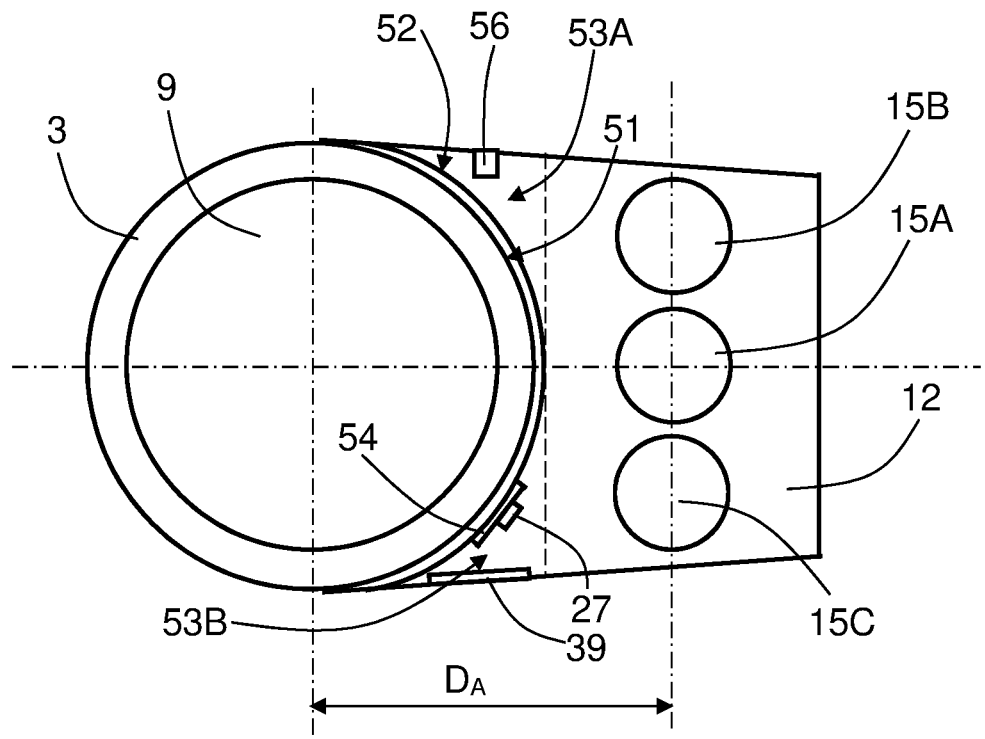
FIG. 13B shows a schematic top view of the dust extractor with three fine filter parts in a first configuration.
Figure 13C:
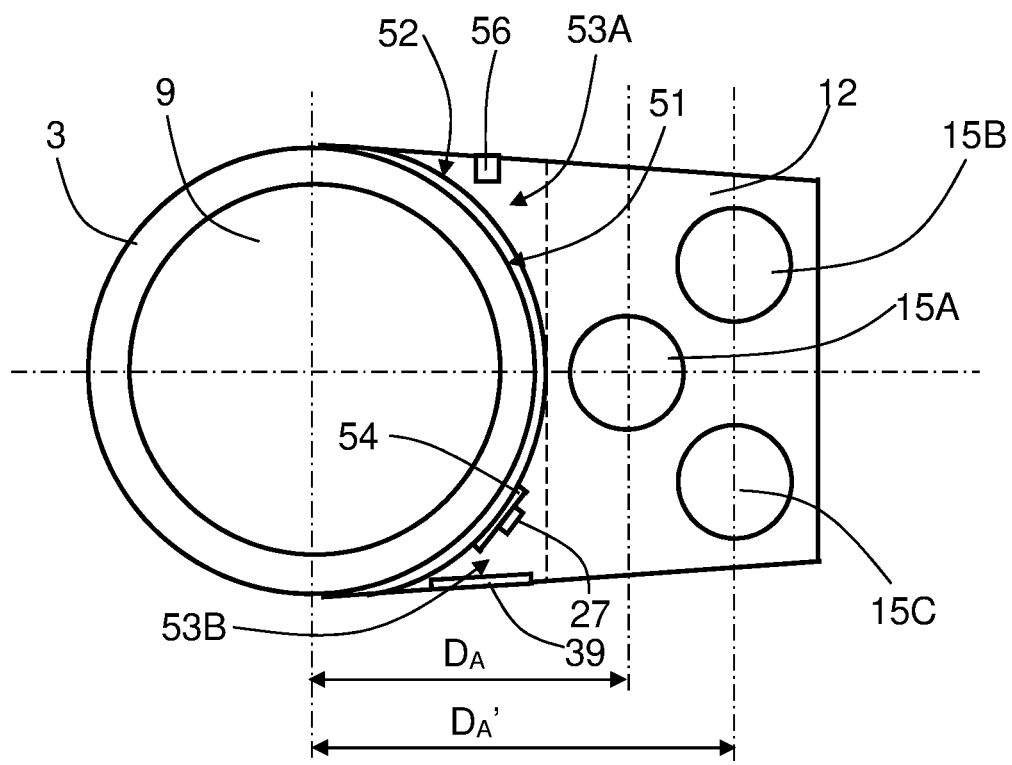
FIG. 13C shows a schematic top view of the dust extractor with three fine filter parts in a second configuration.

With reference to FIG. 13A, FIG. 13B and FIG. 13C, there can be more than one fine filter part. In FIG. 13A there are two fine filter parts 15A, 15B that are mounted along a line, and in FIG. 13B there are three fine filter parts 15A, 15B that are mounted along a line. The fine filter parts need not be mounted along a line as illustrated in FIG. 13C where the fine filter parts 15A, 15B, 15C are mounted in a triangular manner. It is also conceivable to have more than the three fine filter parts shown in FIG. 13B and FIG. 13C. The previously discussed first distance $D_A$ is measured with respect to the fine filter part 15A that is closest to the coarse filter part 9 as illustrated in FIG. 13A-13C, or, alternatively, the fine filter part 15A that is closest to the center axis 48 of the dust cyclone container 3. According to some aspects, there is a blower motor arranged for each one of the fine filter parts 15A, 15B, 15C. According to some aspects, there are at least two fine filter parts 15A, 15B, 15C that can be arranged in any suitable configuration.

According to some aspects, there is a second distance $D_A'$ that is a shortest distance between the center axis 60 of the course filter part 9 and the center axis of a fine filter part 15B, 15C that is positioned farthest from the coarse filter part 9 as illustrated in FIG. 13C, where the second distance $D_A'$ falls below the maximum interior diameter $D_B$ of the dust cyclone container 3. According to some aspects, the second distance $D_A'$ is the shortest distance between the center axis 48 of the dust cyclone container 3 and the center axis of a fine filter part 15B, 15C that is farthest away from the dust cyclone container 3. According to some aspects, the second distance $D_A'$ is less than 1.2 times the diameter $D_B$ of the dust cyclone container 3 along the extension of the fine filter part 15, preferably the second distance $D_A'$ is less than 1.1 times the diameter $D_B$ of the dust cyclone container 3 and even more preferably less than 1.0 times the diameter $D_B$ of the dust cyclone container 3.

Figure 14:
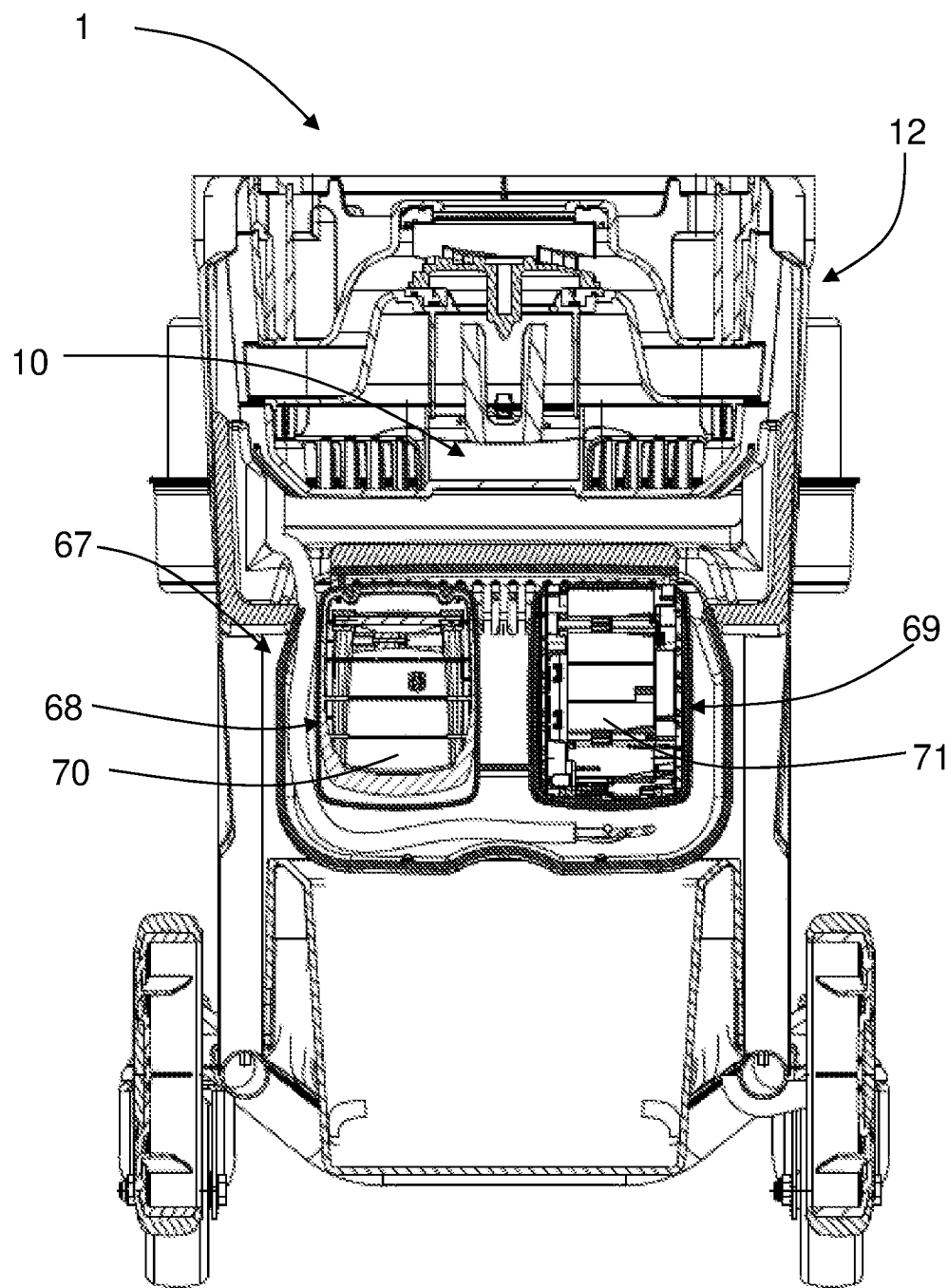
FIG. 14 shows a rear section view of the dust extractor with two battery slots.

With reference to FIGS. 9 and 14, according to some aspects, the blower motor 10 is adapted to be powered at least partly by at least one onboard battery 61, that is arranged to be received in at least one battery slot 62 provided in the fine filter section 12.

According to some aspects, the at least one battery slot 62 is positioned between or below a bottom 29 of the fine filter part 15 in a normal operative position of the dust extractor 1, where the bottom 29 is positioned opposite the opening 28 of the fine filter part 15 when the fine filter part 15 is mounted to the fine filter section 12.

According to some aspects, the battery slot 62 at least partly is positioned on, or below, a bottom plane Pb that runs perpendicular to the center axis 48 of the dust cyclone container 3 and where a bottom 5 of the dust cyclone container 3, in the region of the mounting position for the dust container 59, lies in the bottom plane Pb. According to aspects, the at least one battery slot 62 is arranged such that the direction of insertion of the at least one battery into the at least one slot is essentially parallel with the plane Pb and in a direction towards the dust container 3.

According to some aspects, the battery slot 62 is positioned below the bottom 29 of the fine filter part 15 and the bottom plane Pb, where the bottom 29 is positioned opposite the opening 28 of the fine filter part 15 when the fine filter part 15 is mounted to the fine filter section 12, and where the bottom plane Pb runs perpendicular to the center axis 48 of the dust cyclone container 3, and where the bottom 5 of the dust cyclone container 3, in the region of the mounting position for the dust container 59, lies in the bottom plane Pb.

According to some aspects, the onboard battery 61 comprises at least two battery cell parts. As shown in FIG. 14 there is a battery housing part 67 that in turn comprises two battery slots 68, 69, each battery slot 68, 69 being adapted to accommodate one corresponding onboard battery 70, 71, the onboard batteries 70, 71 being adapted to power the blower motor 10.

Generally there is a battery housing part 67 that in turn comprises at least one battery slot. According to some aspects, the battery housing part 67 is mounted to the fine filter section 12 or to the mobility section 66. The blower motor 10, or blower motors, is positioned in the fine filter section 12.

Figure 20:
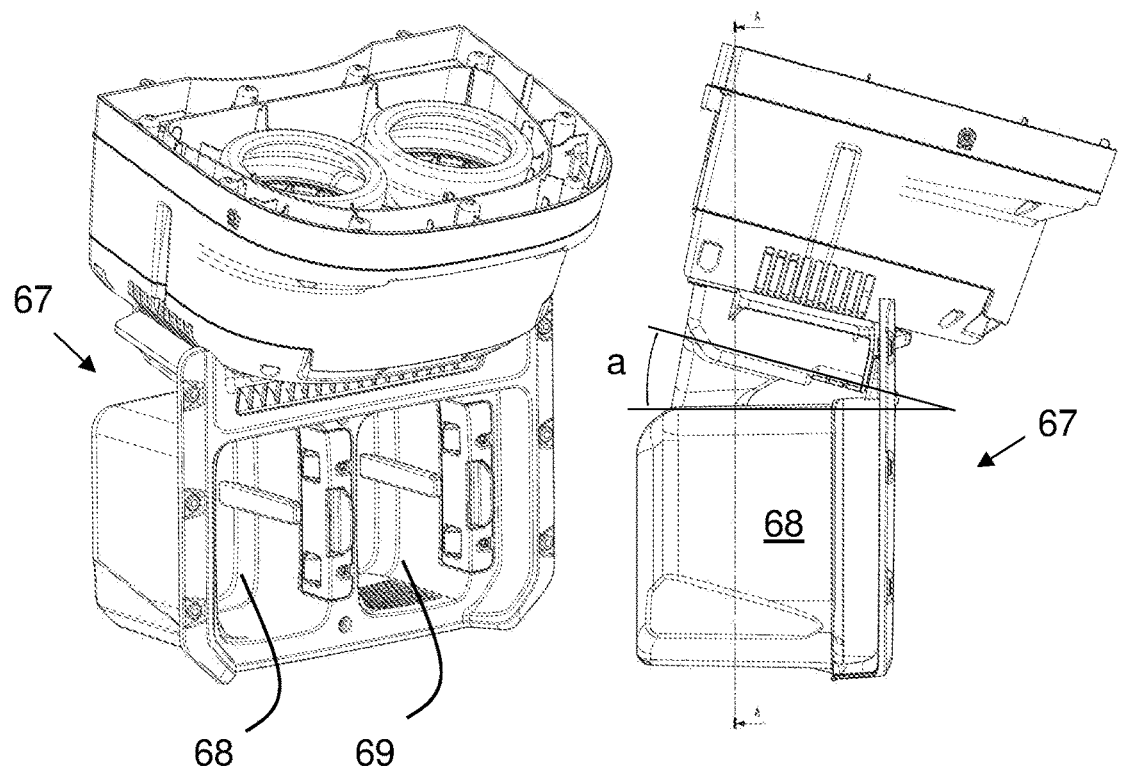
FIG. 20 illustrates battery compartments.
Figure 21:
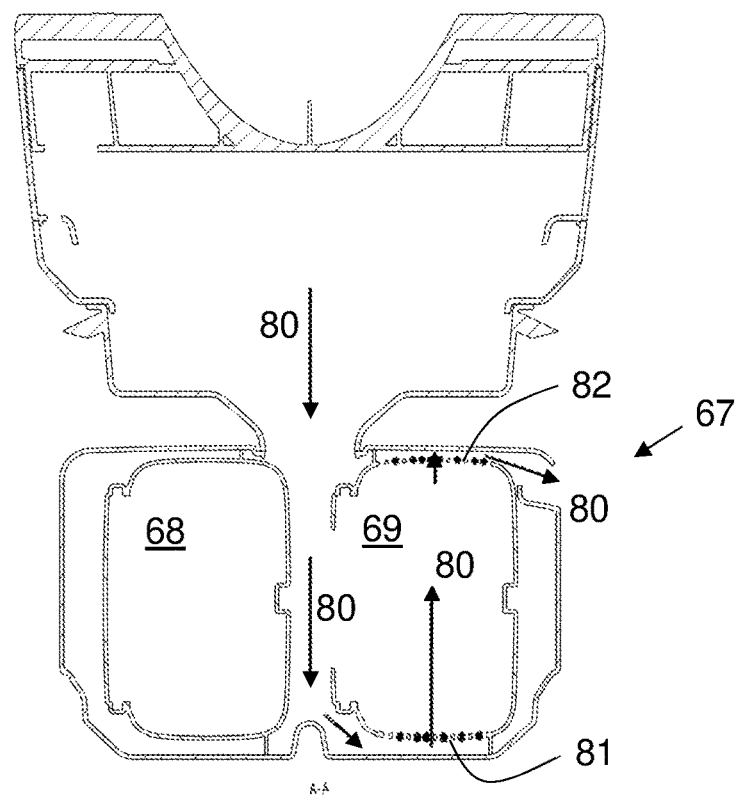
FIG. 21 shows a cooling ai flow in a battery compartment.

FIGS. 20-21 illustrate an example battery slot 62 comprising a first battery compartment 68 and a second battery compartment 69. A battery insertion direction B of the battery slot 62 is arranged at an angle a with respect to a plane orthogonal to the center axis 55 of the fine filter part 15. This angle a may be configured at about 10-30 degrees at a downward slope with respect to a horizontal plane when the dust extractor 1 is in use, which simplifies insertion of the batteries into the compartments 68, 69.

FIG. 21 illustrates a cooling air channel, where the air exiting, e.g., the fine filter part is guided along a path 80 through at least one battery compartment 68, 69 of the battery slot 62. Thus, the air flow through the dust extractor generated by the main dust extractor blowers is used also to cool the battery on a battery powered version of the dust extractor.

The battery slot 62 may, as illustrated in FIGS. 20 and 21, comprise a first battery compartment 68 and a second battery compartment 69, where the path 80 passes only via the second battery compartment 69. In this case the other battery compartment is a dummy battery compartment hat is only used for storing a replacement battery.

According to aspects, the battery slot 62 comprises a first battery compartment 68 and a second battery compartment 69, where one or both battery compartments 68, 69 comprise a cooling air entry aperture 81 and a cooling air exit aperture 82, where the air through the fine filter part 15 is arranged to enter the battery compartment via the cooling air entry aperture 81 after having passed through the fine filter part, and to exit the battery compartment via the cooling air exit aperture 82.

FIGS. 22-24 illustrate a top lid for a dust extractor 1 which comprises a resilient strap 83 configured to hold, e.g., a hose wound around the dust extractor body. To make wounding easier, the dust extractor body in vicinity of the strap has been formed with a curvature 84.

The lid also comprises a handle portion 84, which allows an operator to push and/or pull the machine in a convenient manner.

The terms upstream and downstream are defined relative a normal flow direction during normal running of the dust extractor 1.

According to some aspects, generally, the fine filter part 15 can be mounted to the fine filter section 12 in other ways than previously described. Generally, the fine filter part 15 comprises filter mounting engagement means 20, 73 that are adapted for sealingly mounting the fine filter part 15 to an operational filtering position in the fine filter section 12. The filter mounting engagement means can be constituted by the previously described filter mounting thread means 20 that are adapted to engage corresponding filter section thread means 25 in the fine filter section 12 when the fine filter part 15 is mounted to the fine filter section 12.

Alternatively, according to some aspects, with reference to FIG. 15 and FIG. 16, the filter mounting engagement means comprises a circumferentially running seal 73 facing radially outwards from the center axis 55 of the fine filter part 15. The seal 73 is preferably made from an elastic polymeric material, such as rubber, although other elastic materials with sealing properties are conceivable, and has according to some aspects an annular shape. More particularly, the seal 73 comprises an axial seal part 73a, arranged to rest on a circumferentially running edge part 74 comprised in the fine filter section 12, and a radial seal part 73c axially distanced from the axial seal part 73a, i.e. axially distanced along a line parallel to the center axis 55 of the fine filter section 15. Both the radial seal part 73c and the axial seal part 73a protrude radially outwards from the opening 28, and the radially outer edge of the radial seal part 73c has an outer diameter dot that falls below an outer diameter $d_{o2}$ of the radially outer edge of the axial seal 73a. In other words, the axial seal part 73a protrudes beyond the radial seal part 73c in a direction perpendicular to the center axis 55.

According to some aspects, with reference to FIG. 16, the axial seal part 73a and the radial seal part 73c are separated along a line L1 parallel to the center axis 55 of the fine filter part 15, wherein the axial seal part 73a is arranged closer to the opening 28 compared to the radial seal part 73c.

The axial seal part 73a extends radially past a line L2 orthogonal to the center axis 55 of the fine filter part 15, and the radial extension of the radial seal part 73c is limited by the line L2 orthogonal to the center axis 55 of the fine filter part 15.

According to some aspects, the seal 73 may comprise an intermediate seal part 73b located axially between the axial seal part 73a and the radial seal part 73c. These seal parts 73a, 73b, 73c are preferably coherently arranged and are separated along the center axis 55 of the fine filter part 15. The axial seal part 73a is closest to the opening 28 and the intermediate seal part 73b is arranged between the axial seal part 73a and the radial seal part 73c along an axis parallel to the center axis 55. FIG. 16 shows an enlarged part of the seal 73 where the seal parts 73a, 73b, 73c are separated by dashed lines.

Alternatively, the seal 73 comprises at least two seal portions circumventing the fine filter part 15, the portions being separated axially by a distance, i.e. the seal 73 does not constitute one coherent body but at least two separate bodies, a first portion of the seal 73 comprising the axial seal part 73a and the second portion of the seal 73 comprising the radial seal part 73c.

According to some aspects, the axial seal part 73a protrudes beyond the radial seal part 73c in a direction perpendicular to the center axis 55.

According to some aspects, a cross-section of the radial seal part 73c along a plane through the center axis of the fine filter part 15 has a tapered form, tapering radially outwards.

According to some aspects, the axial seal part 73a and the radial seal part 73c mainly protrude away from the intermediate seal part 73b, perpendicular to the center axis 55.

According to some aspects, as illustrated schematically and enlarged in FIG. 16, the edge part 74 comprises a rim part 75 that extends radially towards a mounted fine filter 15. The rim part 75 is adapted to be positioned below the radial seal part 73c when the fine filter part 15 is mounted to the fine filter section 12 and in a normal operative position of the fine filter section 12. Then, the axial seal part 73a provides sealing in an axial direction on an uppermost edge 76 of the edge part 74, along the center axis 55, and the radial seal part 73c provides sealing in a radial direction with respect to the center axis 55. The radial seal 73c engaging a circumferentially running indented portion 77 of the edge part 74 between the rim part 75 and the uppermost edge 76 of the edge part 74.

This means that when the fine filter part 15 is mounted to the fine filter section 12, the radial seal part 73c of the seal 73 is brought into engagement with the indented portion 77. The radial seal part 73c of the seal 73 is thus snapped into place such that a user can know when the fine filter part 15 has been correctly mounted to the fine filter section 12.

When removing the fine filter part 15 from the fine filter section 12, the filter lid 16 is mounted to the fine filter part 15 as described previously and then, by holding the handle 19, a user can lift the fine filter part 15 out of the fine filter section 12 by overcoming the friction between the seal 73 and the indented portion 77 such that the fine filter part 15 is released.

When the filter lid 16 is mounted to the fine filter part 15, it can be screwed into place without the fine filter part 15 turning in the fine filter section 12 due to the friction between the seal 73 and the edge 74.

According to some aspects, the intermediate seal part 73b does not need to be in contact, at least partially, with the fine filter section 12 when the fine filter part 15 is mounted to the fine filter section 12.

According to some aspects, the filter rim 32 is made in a plastic material.

According to some aspects, with reference to FIG. 3 and FIG. 10, the second air guiding part 17 is adapted to face the filter rim 32 of the fine filter part 15 when the fine filter part 15 is mounted to the fine filter section 12 and the lid arrangement 13, 14 is attached to the fine filter section 12.

According to some aspects, the second air guiding part 17 is either adapted to be in a sealing contact with the filter rim 32, and at least adapted to engage the filter rim 32, or adapted to be positioned a certain distance from the filter rim 32. In any case, the second air guiding part 17 is adapted to prevent the fine filter part 15 from getting loose from its mounted position in the fine filter section 12. This is the case for any type of filter mounting engagement means 20, 73.

According to some aspects, in the case of the filter mounting engagement means comprising the circumferentially running seal 73 as described above with reference to FIG. 15 and FIG. 16, when closing the lid arrangement 13, 14 such that in particular the second lid part 14 becomes attached to the fine filter section 12, the second air guiding part 17 can press the radial seal part 73c of the seal 73 axially downwards to the position where the axial seal 73a meets the uppermost edge 76 of the edge part 74 and such that the radial seal part 73c of the seal 73 is brought into engagement with the indented portion 77.

According to some aspects, in the case of the filter mounting engagement means comprising the filter mounting thread means 20, when closing the lid arrangement 13, 14 such that in particular the second lid part 14 becomes attached to the fine filter section 12, an incorrectly mounted fine filter part 15 can be detected by the second lid part 14 not being possible to close completely, the second air guiding part 17 contacting the filter rim 32 in an incorrectly elevated position.

It need not be the previously described second air guiding part 17 that is adapted to face the filter rim 32 of the fine filter part 15 when the fine filter part 15 is mounted to the fine filter section 12 and the lid arrangement 13, 14 is attached to the fine filter section 12 as described above. It may be any suitable interior wall formation 17, 18, such as for example the second air flow containing part 18. The second air flow containing part 18 can be the only interior wall formation in the second lid part 14 and be positioned such that it is adapted to face the filter rim 32 of the fine filter part 15 as described.

Generally, the present disclosure relates to a fine filter part kit 63, comprising: a replacement fine filter part 15 that is adapted to be mounted to a fine filter section 12 for a dust extractor 1, wherein the fine filter part kit 63 further comprises a filter lid 16 that is adapted to be mounted to a corresponding used fine filter part 15 to be replaced, already mounted to the fine filter section 12, and thereby seal an opening 28 of a particle containing space inside the used fine filter part 15 before removing the used fine filter part 15, such that release of particles contained in the particle containing space into the ambient air is prevented and a secure disposal of the used fine filter part 15 is enabled.

According to some aspects, the filter lid 16 comprises a handle 19 such that a user is enabled to lift and handle the fine filter part 15 by means of the handle 19 when the filter lid 16 is mounted to the fine filter part 15.

According to some aspects, the filter lid comprises lid thread means 30 and the fine filter part 15 comprises filter closing thread means 21 that are adapted to engage the lid thread means 30 when the filter lid 16 is mounted to the fine filter part 15.

According to some aspects, the fine filter part 15 further comprises filter mounting engagement means 20, 73 that is adapted for sealingly mounting the fine filter part 15 to an operational filtering position in the fine filter section 12.

According to some aspects, the fine filter part 15 comprises a filter rim 32 surrounding an opening 28 of a particle containing space inside the fine filter part 15, where the filter mounting engagement means 73 comprises a circumferentially running seal 73 facing radially outwards from a center axis 55 of the fine filter part 15, which seal 73 in turn comprises an axial seal part 73a, and a radial seal part 73c, which seal parts 73a, 73c are separated along a line parallel to the center axis 55 of the fine filter part 15 such that the axial seal part 73a is closest to the opening 28.

According to some aspects, the seal 73 comprises an intermediate seal part 73b that is arranged between the axial seal part 73a and the radial seal part 73c, where the seal parts 73a, 73b, 73c are coherently arranged.

According to some aspects, the axial seal part 73a and the radial seal part 73c protrude beyond the intermediate seal part 73b in a direction perpendicular to the center axis 55.

According to some aspects, the seal 73 has an annular shape and is made in an elastic polymeric material, preferably rubber.

According to some aspects, the axial seal part 73a protrudes beyond the radial seal part 73c in a direction perpendicular to the center axis 55.

According to some aspects, the filter mounting engagement means 73 comprises filter mounting thread means 20 that are adapted to engage corresponding filter section thread means 25 in the fine filter section 12 when the fine filter part 15 is mounted to the fine filter section 12.

According to some aspects, the filter mounting thread means 20 are outer thread means and the filter section thread means 25 are inner thread means.

According to some aspects, the filter closing thread means 21 are inner thread means, and the lid thread means 30 are outer thread means.

According to some aspects, the filter closing thread means 21 and the filter mounting thread means 20 are adapted to be tightened in mutually opposite directions.

According to some aspects, the filter mounting thread means 20 and the filter section thread means 25 form a bayonet arrangement where bayonet pins 20 engage bayonet thread slots 25, the filter mounting thread means 20 comprising bayonet pins 20 and the filter section thread means 25 comprising bayonet thread slots 25.

According to some aspects, there are at least three circumferentially and symmetrically positioned radially protruding bayonet pins 20, and preferably four circumferentially and symmetrically positioned radially protruding bayonet pins 20.

The present disclosure also relates to a fine filter part 15 that is adapted to be mounted to a fine filter section 12 of a dust extractor 1, the fine filter part 15 comprising an opening 28 of a particle containing space inside the fine filter part 15, and filter mounting engagement means 20, 73 that are adapted for sealingly mounting the fine filter part 15 to an operational filtering position in the fine filter section 12 and filter closing thread means 21 that are adapted to engage corresponding filter lid thread means 30 of a filter lid 16.

According to some aspects, the fine filter part 15 comprises a filter rim 32 surrounding the opening 28, where the filter mounting engagement means 73 comprises a circumferentially running seal 73 facing radially outwards from a center axis 55 of the fine filter part, which seal 73 in turn comprises an axial seal part 73a and a radial seal part 73c, which seal parts 73a, 73c are separated along a line parallel to the center axis 55 of the fine filter part 15 such that the axial seal part 73a is closest to the opening 28.

According to some aspects, the seal 73 comprises an intermediate seal part 73b that is arranged between the axial seal part 73a and the radial seal part 73c, where the seal parts 73a, 73b, 73c are coherently arranged.

According to some aspects, the axial seal part 73a and the radial seal part 73c protrude beyond the intermediate seal part 73b in a direction perpendicular to the center axis 55.

According to some aspects, the seal 73 has an annular shape and is made in an elastic polymeric material, preferably rubber.

According to some aspects, the axial seal part 73a protrudes beyond the radial seal part 73c in a direction perpendicular to the center axis 55.

According to some aspects, the filter mounting engagement means 73 comprises filter mounting thread means 20 that are adapted for sealingly mounting the fine filter part 15 to an operational filtering position in the fine filter section 12 by engaging corresponding filter section thread means 25 in the fine filter section 12, According to some aspects, the filter mounting thread means 20 are outer thread means and the filter closing thread means 21 are inner thread means.

According to some aspects, the fine filter part 15 comprises a filter rim 32 surrounding the opening 28, where the filter rim 32 comprises protrusions 31 that enable a user to screw the fine filter part 15 in a first direction of rotation, wherein the protrusions preferably are wedge-shaped.

According to some aspects, the filter closing thread means 21 are adapted to be tightened in a second direction of rotation.

According to some aspects, the filter mounting thread means 20 and the filter closing thread means 21 are adapted to be tightened in mutually opposite directions.

According to some aspects, the filter mounting thread means 20 are bayonet pins 20 that are adapted to engage bayonet thread slots 25 in the fine filter section 12.

According to some aspects, there are at least three circumferentially and symmetrically positioned radially protruding bayonet pins 20, and preferably four circumferentially and symmetrically positioned radially protruding bayonet pins 20.

According to some aspects, the fine filter part 15 is constituted by a filter cylinder that comprises a filter material 43 and has the opening 28 in one end and a bottom 29 that is opposite the opening 28 such that the filter material 43 has a clean side downstream the fine filter part 15, and a contaminated side, upstream the fine filter part 15 when the fine filter part 15 is positioned in its operative position.

According to some aspects, the fine filter part 15 is a HEPA, High Efficiency Particulate Air/High Efficiency Particulate Arrestance, filter.

According to some aspects, the fine filter part 15 is a HEPA filter of any one of the HEPA classes 13 or 14.

The present disclosure also relates to a fine filter part 15 and a fine filter section 12 adapted for mounting to a dust cyclone container 3, where the fine filter part 15 is adapted to be mounted to the fine filter section 12, the fine filter part 15 comprising an opening 28 of a particle containing space inside the fine filter part 15 and filter mounting engagement means 20, 73 that are adapted for sealingly mounting the fine filter part 15 to an operational filtering position in the fine filter section 12 and filter closing thread means 21 that are adapted to engage corresponding filter lid thread means 30 in a filter lid 16.

According to some aspects, the fine filter part 15 comprises a filter rim 32 surrounding the opening 28, where the filter mounting engagement means 73 comprises a circumferentially running seal 73 facing radially outwards from a center axis 55 of the fine filter part, which seal 73 in turn comprises an axial seal part 73a and a radial seal part 73c, which seal parts 73a, 73c are separated along a line parallel to the center axis 55 of the fine filter part 15 such that the axial seal part 73a is closest to the opening 28.

According to some aspects, the seal 73 comprises an intermediate seal part 73b that is arranged between the axial seal part 73a and the radial seal part 73c, where the seal parts 73, 73b, 73c are coherently arranged.

According to some aspects, the axial seal part 73a and the radial seal part 73c protrude beyond the intermediate seal part 73b perpendicular to the center axis 55.

According to some aspects, the seal 73 has an annular shape and is made in an elastic polymeric material, preferably rubber.

According to some aspects, the axial seal part 73a protrudes beyond the radial seal part 73c in a direction perpendicular to the center axis 55.

According to some aspects, the fine filter section 12 comprises a circumferentially running edge part 74 that comprises a rim part 75 that extends radially towards a mounted fine filter 15, where the rim part 75 is adapted to be positioned below the radial seal part 73c when the fine filter part 15 is mounted to the fine filter section 12 and in a normal operative position of the fine filter section 12.

According to some aspects, the edge part 74 comprises a circumferentially running indented portion 77 positioned between the rim part 75 and the uppermost edge 76, where the indented portion 77 is adapted to receive the radial seal 73c.

According to some aspects, the fine filter section 12 comprises a circumferentially running edge part 74, where the axial seal part 73a is adapted to provide sealing in an axial direction on an uppermost edge 76 of the edge part 74, along the center axis 55, and the radial seal part 73c is adapted to provide sealing in a radial direction with respect to the center axis 55.

According to some aspects, the filter mounting engagement means 73 comprises filter mounting thread means 20 that are adapted for sealingly mounting the fine filter part 15 to an operational filtering position in the fine filter section 12 by engaging corresponding filter section thread means 25 in the fine filter section 12.

According to some aspects, the filter mounting thread means 20 are outer thread means and the filter closing thread means 21 are inner thread means.

According to some aspects, the fine filter part 15 comprises a filter rim 32 surrounding the opening 28, where the filter rim 32 preferably comprises protrusions 31 that enable a user to screw the fine filter part 15 in a first direction of rotation, wherein the protrusions preferably are wedge-shaped.

According to some aspects, the fine filter section 12 comprises a second fine filter section sealing rim 64 that is adapted to seal against the filter rim 32 when the fine filter part 15 is mounted.

According to some aspects, the filter closing thread means 21 are adapted to be tightened in a second direction of rotation.

According to some aspects, the filter mounting thread means 20 and the filter section thread means 25 are adapted to be tightened together in a first direction of rotation, and where the filter closing thread means 21 are adapted to be tightened in a second direction of rotation, opposite the first direction of rotation.

According to some aspects, the filter mounting thread means 20 are bayonet pins 20 that are adapted to engage bayonet thread slots 25 that constitute the filter section thread means 25.

According to some aspects, there are at least three circumferentially and symmetrically positioned radially protruding bayonet pins 20 and preferably four circumferentially and symmetrically positioned radially protruding bayonet pins 20.

According to some aspects, the fine filter part 15 is constituted by a filter cylinder that comprises a filter material 43 and has the opening 28 in one end and a bottom 29 that is opposite the opening 28 where the filter material 43 has a clean side downstream the fine filter part 15, and a contaminated side, upstream the fine filter part 15 when the fine filter part 15 is positioned in its operative position.

According to some aspects, the fine filter part 15 is a HEPA, High Efficiency Particulate Air/High Efficiency Particulate Arrestance, filter.

According to some aspects, the fine filter part 15 is a HEPA filter of any one of the HEPA classes 13 or 14.

According to some aspects, the fine filter section 12 comprises a control unit 27, and preferably a user interface in the form of an operator panel 39.

According to some aspects, the fine filter section 12 comprises at least one onboard battery 61, wherein the at least one battery 61 is arranged to be received in at least one battery slot 62 provided in either the fine filter section 12 or a mobility section 66 that comprises a frame 6 and wheels 7, 8a, 8b connected to the frame 6.

According to some aspects, the fine filter section 12 is adapted to be releasably attachable to the mobility section 66 of a dust extractor 1, where the mobility section 66 comprises a frame 6 and wheels 7, 8a, 8b connected to the frame 6.

The present disclosure also relates to a method for handling a fine filter part 15 that is mounted in a fine filter section 12 in a dust extractor 1, comprising:

screwing S100 a filter lid 16, having filter lid thread means 30, onto the fine filter part 15, having filter mounting thread means 20 and filter closing thread means 21, by letting the filter lid thread means 30 engage the filter closing thread means 21 in a second direction of rotation such that the filter lid 16 becomes attached to the fine filter part 15;

continuing the screwing S200 of the filter lid 16 in the second direction of rotation such that the filter mounting thread means 20 and filter section thread means 25, comprised in the fine filter section 12, are released from each other enabling the fine filter part 15 to become released from the fine filter section 12; and removing S300 the fine filter part 15 from the fine filter section 12.

According to some aspects, the filter mounting thread means 20 and the filter section thread means 25 are released in the second direction of rotation and the filter lid thread means 30 and the filter closing thread means 21 are tightened in the second direction of rotation.

According to some aspects, the method further comprises mounting S400 a replacement fine filter part 15 to the fine filter section 12 by screwing the replacement fine filter part 15 in a first direction of rotation, opposite the second direction of rotation.

The invention claimed is:

1. A fine filter part kit, comprising:
a replacement fine filter part that is adapted to be mounted to a fine filter section for a dust extractor, wherein the fine filter part kit further comprises a filter lid that is adapted to be mounted to a corresponding used fine filter part to be replaced, already mounted to the fine filter section, and thereby seal an opening of a particle containing space inside the used fine filter part before removing the used fine filter part, such that release of particles contained in the particle containing space into the ambient air is prevented and a secure disposal of the used fine filter part is enabled.

2. A fine filter part that is adapted to be mounted to a fine filter section of a dust extractor, the fine filter part comprising an opening of a particle containing space inside the fine filter part, and filter mounting engagement means that are adapted for sealingly mounting the fine filter part to an operational filtering position in the fine filter section and filter closing thread means that are adapted to engage corresponding filter lid thread means of a filter lid.

3. The fine filter part according to claim 2, wherein the fine filter part comprises a filter rim surrounding the opening, wherein the filter mounting engagement means comprises a circumferentially running seal facing radially outwards from a center axis of the fine filter part arranged to provide a seal between the fine filter part and an uppermost edge of the fine filter section.

4. The fine filter part according to claim 3, wherein the circumferentially running seal comprises an axial seal part and a radial seal part, the axial and radial seal parts being separated along a line parallel to the center axis of the fine filter part, wherein the axial seal part is arranged closer to the opening compared to the radial seal part.

5. The fine filter part according to claim 3, wherein the axial seal part extends radially past a line orthogonal to the center axis of the fine filter part, wherein the radial extension of the radial seal part is limited by the line orthogonal to the center axis of the fine filter part.

6. The fine filter part according to claim 3, wherein the circumferentially running seal comprises an intermediate seal part that is arranged between the axial seal part and the radial seal part, wherein the axial, intermediate, and radial seal parts are coherently arranged.

7. The fine filter part according to claim 6, wherein the axial seal part and the radial seal part protrude beyond the intermediate seal part in a direction perpendicular to the center axis.

8. The fine filter part according to claim 3, wherein the circumferentially running seal has an annular shape and is made in an elastic polymeric material.

9. The fine filter part according to claim 3, wherein the axial seal part protrudes beyond the radial seal part in a direction perpendicular to the center axis.

10. The fine filter part according to claim 2, wherein the filter mounting engagement means comprises filter mounting thread means that are adapted for sealingly mounting the fine filter part to an operational filtering position in the fine filter section by engaging corresponding filter section thread means in the fine filter section.

11. The fine filter part according to claim 10, wherein the filter mounting thread means are outer thread means and the filter closing thread means are inner thread means.

12. The fine filter part according to claim 10, wherein the fine filter part comprises a filter rim surrounding the opening, wherein the filter rim comprises protrusions that enable a user to screw the fine filter part in a first direction of rotation, wherein the protrusions are wedge-shaped.

13. The fine filter part according to claim 10, wherein the filter closing thread means are adapted to be tightened in a second direction of rotation.

14. The fine filter part according to claim 10, wherein the filter mounting thread means and the filter closing thread means are adapted to be tightened in mutually opposite directions.

15. The fine filter part according to claim 10, wherein the filter mounting thread means are bayonet pins that are adapted to engage bayonet thread slots in the fine filter section.

16. The fine filter part according to claim 15, wherein there are at least three circumferentially and symmetrically positioned radially protruding bayonet pins.

17. The fine filter part according to claim 2, wherein the fine filter part is constituted by a filter cylinder that comprises a filter material and has the opening in one end and a bottom that is opposite the opening such that the filter material has a clean side downstream the fine filter part, and a contaminated side, upstream the fine filter part when the fine filter part is positioned in its operative position.

18. The fine filter part according to claim 2, wherein the fine filter part is a HEPA, High Efficiency Particulate Air/High Efficiency Particulate Arrestance, filter.

19. A fine filter part according to claim 2, wherein the filter lid comprises a handle arranged to allow an operator to lift the fine filter part by means of the handle when the filter lid is mounted to the fine filter part.

20. A method for handling a fine filter part that is mounted in a fine filter section of a dust extractor, comprising:
  screwing a filter lid, having filter lid thread means, onto the fine filter part, having corresponding filter closing thread means, by letting the filter lid thread means engage the filter closing thread means such that the filter lid becomes attached to the fine filter part; and
  removing the fine filter part from the fine filter section by pulling the filter lid attached to the fine filter part in direction of a center axis of the fine filter part, out from the fine filter section.

* * * * *